(12) United States Patent
Kasso et al.

(10) Patent No.: US 11,368,306 B2
(45) Date of Patent: Jun. 21, 2022

(54) TECHNIQUES FOR USING SIGNED NONCES TO SECURE CLOUD SHELLS

(71) Applicant: Oracle International Corporation, Redwood Shores, CA (US)

(72) Inventors: Christopher S. Kasso, Los Altos, CA (US); Peter Grant Gavares, Austin, TX (US); Linda K. Schneider, Santa Clara, CA (US); Amy H. Kang, Mountain View, CA (US); Joseph John Snyder, Wenonah, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/993,970

(22) Filed: Aug. 14, 2020

(65) Prior Publication Data
US 2022/0052849 A1 Feb. 17, 2022

(51) Int. Cl.
 *H04L 9/08* (2006.01)
 *H04L 9/32* (2006.01)
 *H04L 29/08* (2006.01)
 *H04L 67/08* (2022.01)
 *H04L 67/00* (2022.01)
 *H04L 67/143* (2022.01)

(52) U.S. Cl.
 CPC .......... *H04L 9/3213* (2013.01); *H04L 9/0825* (2013.01); *H04L 67/08* (2013.01); *H04L 67/143* (2013.01); *H04L 67/34* (2013.01)

(58) Field of Classification Search
 CPC ............... H04L 9/00; H04L 9/08–0825; H04L 9/32–3213; H04L 67/00; H04L 67/08; H04L 67/14; H04L 67/143; H04L 67/34
 See application file for complete search history.

(56) References Cited

U.S. PATENT DOCUMENTS

| 8,307,072 | B1 | 11/2012 | Melvin |
| 8,625,431 | B2 | 1/2014 | Droux et al. |
| 8,819,362 | B1 | 8/2014 | Duprey et al. |
| 8,954,574 | B1 | 2/2015 | Chheda et al. |
| 9,345,054 | B1 | 5/2016 | Lu |

(Continued)

OTHER PUBLICATIONS

U.S. Appl. No. 16/993,973, "Non-Final Office Action", dated Aug. 2, 2021, 19 pages.

(Continued)

*Primary Examiner* — Michael A Keller
(74) *Attorney, Agent, or Firm* — Kilpatrick Townsend & Stockton LLP

(57) ABSTRACT

Techniques for using signed nonces to secure cloud shells are provided. The techniques include receiving, by a session manager service, a request to connect a user device to a secure connection to a secure shell instance. The session manager service may authorize the user device to access the secure shell instance and may configure the secure shell instance, being described by a shell identifier of the secure shell instance. The techniques also include generating, by the session manager service, a nonce token and providing the shell identifier, and a router address of the secure shell router to the user device. The techniques also include generating, by the session manager service, a signed nonce token using the nonce token; and providing the signed nonce token and the shell identifier to a user device.

20 Claims, 14 Drawing Sheets

(56) References Cited

U.S. PATENT DOCUMENTS

| | | | |
|---|---|---|---|
| 9,935,788 B2 * | 4/2018 | Fausak | H04L 67/42 |
| 9,973,567 B2 | 5/2018 | Chen et al. | |
| 10,334,708 B2 | 6/2019 | Kim et al. | |
| 10,397,273 B1 | 8/2019 | Stickle et al. | |
| 10,664,358 B1 | 5/2020 | Chen et al. | |
| 10,819,958 B2 | 10/2020 | Kim et al. | |
| 10,880,405 B2 | 12/2020 | Cooley et al. | |
| 11,003,542 B1 | 5/2021 | Kucherov et al. | |
| 11,038,710 B2 | 6/2021 | Chamarajnager et al. | |
| 2008/0298588 A1 * | 12/2008 | Shakkarwar | H04L 9/0869 |
| | | | 380/255 |
| 2009/0313447 A1 | 12/2009 | Nguyen et al. | |
| 2012/0079221 A1 | 3/2012 | Sivasubramanian et al. | |
| 2012/0084261 A1 | 4/2012 | Parab | |
| 2013/0124807 A1 | 5/2013 | Nielsen et al. | |
| 2016/0119306 A1 * | 4/2016 | Matthews | H04L 63/08 |
| | | | 726/6 |
| 2017/0085558 A1 * | 3/2017 | Ibrahim | G06Q 20/385 |
| 2018/0234294 A1 | 8/2018 | Wadekar et al. | |
| 2019/0097838 A1 | 3/2019 | Sahoo et al. | |
| 2019/0303246 A1 | 10/2019 | Gokhale et al. | |
| 2020/0259652 A1 * | 8/2020 | Schmaltz, III | H04L 9/3247 |
| 2020/0320199 A1 * | 10/2020 | Sheth | H04L 9/0841 |
| 2020/0364734 A1 | 11/2020 | Glazier et al. | |

OTHER PUBLICATIONS

International PCT Application No. PCT/US2021/045797, "International Search Report and Written Opinion", dated Nov. 24, 2021, 11 pages.

U.S. Appl. No. 17/078,835, "Notice of Allowance", dated Mar. 1, 2022, 10 pages.

* cited by examiner

TECHNIQUES FOR USING SIGNED NONCES TO SECURE CLOUD SHELLS

CROSS-REFERENCES TO RELATED APPLICATIONS

This application is related to U.S. Non-Provisional application Ser. No. 16/993,973, filed on Aug. 14, 2020, entitled "TECHNIQUES FOR UTILIZING MULTIPLE NETWORK INTERFACES FOR A CLOUD SHELL" and U.S. Non-Provisional application Ser. No. 17/078,835, filed on Oct. 23, 2020, entitled "TECHNIQUES FOR PERSISTING DATA ACROSS INSTANCES OF A CLOUD SHELL," the disclosures of which are incorporated by reference in their entirety for all purposes.

BACKGROUND

Cloud-based platforms provide scalable and flexible computing resources for users. Such cloud-based platforms, also referred to as infrastructure as a service (IaaS), may offer entire suites of cloud solutions around a customer's data, for example, solutions for authoring transformations, loading data, and presenting the data. IaaS systems may implement security protocols to protect against unauthorized access to user data.

BRIEF SUMMARY

Techniques are provided (e.g., a method, a system, non-transitory computer-readable medium storing code or instructions executable by one or more processors) for securing cloud shells to run one or more terminals, using signed nonces in coordination with one or more additional security operations.

In a first aspect, a method includes receiving, by a session manager service, a request to connect a user device to a secure connection to a secure shell instance, authorizing, by a session manager service, the user device; configuring, by the session manager service, the secure shell instance being described by a shell identifier of the secure shell instance, generating, by the session manager service, a nonce token, signing, by the session manager service, the nonce token to generate a signed nonce token, and providing, by the session manager service, the signed nonce token, the shell identifier, and a router address to the user device.

In an example authorizing the user device includes receiving a login token comprising a user identifier from the user device, requesting an authorization system public key from an authorization service, authenticating the user device based at least in part on decrypting the login token with the authorization system public key, requesting a delegation token from the authorization service at least in part by providing the user identifier, a resource identifier of a resource identified in the request, and an expiration period of the request, and receiving the delegation token from the authorization service, wherein the authorization service is configured to generate the delegation token upon authorizing access to the resource identified in the request within the expiration period.

In an example, signing the nonce token includes signing the nonce token using a system private key of a public/private key pair held by the session manager service and providing a system public key of the public/private key pair to the secure shell router at the router address.

In an example, the method further includes storing the nonce token in a data store, wherein the nonce token comprises a key sequence and ascertaining whether the nonce token is valid, based at least in part on searching the data store on the key sequence and removing the nonce token from the data store after the secure shell router establishes a secure connection between the user device and the secure shell instance.

In an example, the method further includes terminating the secure shell instance following a period of inactivity or a termination of the secure connection by the user device.

In an example, configuring the secure shell instance includes reserving a block volume, receiving a domain identifier corresponding to the block volume, allocating an instance on the block volume using the domain identifier, the instance being allocated from a plurality of available instances, receiving the shell identifier corresponding to the instance, and installing a configuration file on the instance, the configuration file comprising request information included in the request.

In an example, the secure shell instance runs a docker container, such that the request comprises an instruction to execute a terminal on the docker container.

In a second aspect, a computer system includes one or more processors and a memory in communication with the one or more processors, the memory configured to store computer-executable instructions, wherein executing the computer-executable instructions causes the one or more processors to perform steps including one or more steps of the method of the first aspect and subsequent examples.

In a third aspect, a non-transitory computer-readable storage medium, storing computer-executable instructions that, when executed, cause one or more processors of a computer system to perform steps including one or more steps of the method of the first aspect and subsequent examples.

DETAILED DESCRIPTION

Figure 1:
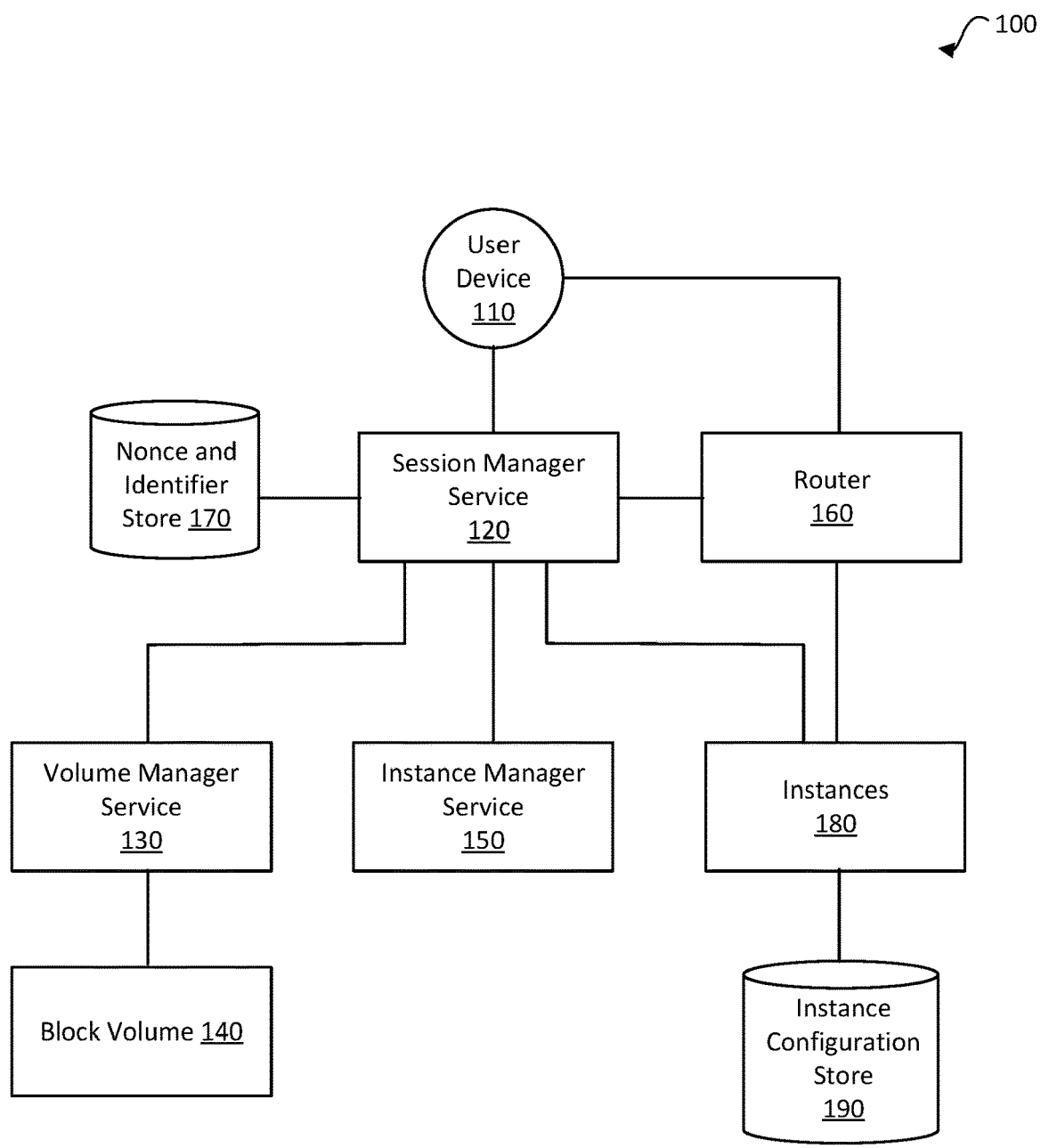
FIG. 1 illustrates an example system for managing secure shell instances, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms provide scalable and flexible computing resources for users. Such cloud-based platforms, also referred to as infrastructure as a service (IaaS) may offer entire suites of cloud solutions around a customer's data, for example solutions for authoring transformations, loading data, and presenting the data. Users of IaaS resources may request to create a secure terminal in a secure shell instance, so that operations and data transfers may be carried out securely (e.g., with two-way encryption via a WebSocket secure, or wss, connection).

In some embodiments, a shell instance can be a specialized compute instance that may run a docker container (e.g., a host) and may allow a user device to run terminals on that docker container. A user device may be assigned a single host, but may also create multiple active terminals on that host. A shell instance may be terminated after a period of inactivity. The instance may run the host, which may in turn run a secure shell (e.g., a terminal). In some embodiments, instances and/or hosts also may be terminated when no terminals have been active on the host for a period of time.

In some embodiments, an instance agent may run on an allocated instance and may handle receiving WebSocket traffic and sending that traffic to a secure shell running on the host. The instance agent may be an HTTP server that may be configured to open secure WebSocket connections and to redirect the input and output to a terminal (e.g., a secure shell running on a docker container) running on the instance. In some embodiments, the agent may identify an updated version of the docker container, may start the docker container, and may create the terminal in the container. In some embodiments, the agent may further specialize the docker container to contain secure shell configuration information and may execute the terminal in the docker container at least in part by passing in specific environmental variables.

In some embodiments, a session manager service can provide command line access to a user's resources from a browser. The session manager service may provide a number of available compute instances that can be allocated and/or specialized to support a specific user account. Providing the available compute instances (e.g., by creating one or more compute instances configured with default parameters prior to receiving a secure shell request) may permit the session manager service to improve latency of system response (e.g., by creating and specializing the instance within 5 seconds, 10 seconds, 30 seconds, 60 second, etc.). The session manager service may also provide a web-based terminal that may allow a user to use IaaS infrastructure resources (e.g., through proprietary and/or other unix commands) on a specialized instance through a secure connection that is validated at multiple operations before the connection is finalized.

In some embodiments, the techniques described herein may be incorporated as computer-executable instructions in a software developer kit (SDK) that may be used by the web-based terminal to create and access these resources. In this way, the SDK could also be used by other providers to implement a secure web-based terminal. Additionally, the techniques described herein may permit a user device to connect to a secure shell running one or more terminals with improved security and latency. For example, by selecting and configuring a secure shell instance from a plurality of available instances, rather than creating a new instance at the time of a request to connect securely to a secure shell, the session manager may potentially improve system latency introduced by the pre-configuration of instances.

Furthermore, implementing one or more techniques for securing the one or more terminals may improve the operation and performance of the systems described herein. For example, providing a nonce token that may be signed by both the session manager service and the user device, with an operation of checking the signatures (e.g., implemented by a router facilitating the connection of the user device to the secure shell instance), may provide improved security and may prevent unauthorized access to the data and or IaaS resources via a terminal running on the secure shell instance. Furthermore, implementing a single-use protocol whereby a validity of the nonce token may be determined in connection to a database of unused nonce tokens may prevent reuse of nonce tokens. Additionally, multi-step security protocols may also provide additional user authentication and resource authorization protections that may permit the session manager service to prevent reuse of login tokens (e.g., tokens generated by an identity authorization service after authenticating a user device) by unauthorized and/or inauthentic user devices. Additionally, configuring the secure shell in a docker container system may improve security by isolating data related to the secure shell and thereby potentially reducing exposure of external data to breach.

FIG. 1 illustrates an example system 100 for managing secure shell instances, in accordance with one or more embodiments. In some embodiments, the system 100 may permit a user to connect securely to a compute instance (e.g., a virtual machine, or "VM" or a docker container). Secure access may permit a user to connect to a distributed computing system resource (e.g., Infrastructure as a Service, or "IaaS") including, but not limited to, distributed storage, compute cores, etc., over an encrypted connection (e.g., https, and/or WebSocket Secure "WSS") for real-time data transfer with a VM of the IaaS system. In some embodiments, a user device 110 may generate a signed request for a secure shell instance, and may send the signed request to a session manager service 120. The session manager service 120 may perform operations as part of validating the user device 110 and configuring a secure shell instance as part of fulfilling the signed request.

In some embodiments, the user device 110 may generate the signed request using a user interface including, but not limited to a graphical user interface console, or a command line interface (CLI). The user interface include an identity authorization service, which may generate a user public/private key pair. In some cases, the user public/private key pair may be a temporary key pair generated, for example, at the initialization of a session, at the time of generating a request for a secure VM connection, etc. The user device 110 may generate the signed request using the private key of the user public/private key pair, as described in more detail in reference to FIG. 2.

In some embodiments, the session manager service 120 may implement one or more authorization steps as part of managing and preparing a secure shell instance, as described in more detail in reference to FIG. 5 and FIG. 7, below. The authorization may include receiving and validating the signed request, for example, by requesting the public key (e.g., from an authorization service) and using the key to validate the signature of the signed request (e.g., as a step of validating the identity of the user device 110). Additionally or alternatively, the public key may be included in a login token provided by the authorization service, as described in more detail in reference to FIG. 2, below.

In some embodiments, the session manager service 120 may fulfill the signed request at least in part by reserving and configuring a secure shell instance. In some cases, the session manager service 120 may communicate with a volume manager service 130 to reserve a block volume 140. The volume manager service 130 may return a domain identifier of the block volume 140 to the session manager service 120. In some embodiments, the domain identifier may describe one or more data centers within a geographic region (e.g., an availability domain, or "AD") of the block volume 140 that has been reserved.

In some embodiments, the session manager service 120 may provide the domain identifier of the block volume 140 (e.g., the AD of the reserved block volume) to an instance manager service 150. The instance manager service 150 may allocate a compute instance in the AD provided by the volume manager service. The instance manager service 150 may provide instance identifier information (e.g., a cloud infrastructure ID) for the allocated instance to the session manager service 120. Allocation of a compute instance may be done on a per-user basis and/or on a per-compartment basis (where a compartment is a logical container that controls access to cloud system resources, and may include sub-compartments). For example, the session manager service 120 may allocate separate instances for a user in different compartments. In contrast, the session manager service 120 may allocate a single compute instance for multiple containers, such that separate containers share the same compute instance, one container per compartment (where a container is a packaged software application that may include application code, runtime, system tools, system libraries, and settings).

In some embodiments, the session manager service 120 may provide the instance identifier to the user device 110, along with a router address of a router 160. The router 160 may be configured to connect the user device to a secure shell instance, as described in more detail below (e.g., via a duplexing web socket connection). Furthermore, the router may also be configured to validate the user device 110 and the session manager service 120 as part of securely connecting the user device 110 to the secure shell instance, as described below.

In some embodiments, the session manager service 120 may generate a nonce token as a part of the authorization and validation of the user device 110 secure connection to a secure shell instance. In some embodiments, the nonce token may be a web token (e.g., a JavaScript Object Notation "json" web token, or "jwt" token) containing information including, but not limited to a header, a validity period (e.g., in minutes before expiration), a key, and/or a random or pseudo-random string (e.g., an alphanumeric sequence of set length, a random or pseudo-random number, or the like). In some cases, the nonce token is generated and provided to the user device 110 along with the instance identifier and the router address.

In some embodiments, the session manager service 120 may store the nonce token in a nonce and identifier store 170. The nonce and identifier store 170 may be a distributed data store (e.g., cloud storage) storing a nonce table, as described in more detail in reference to FIG. 4, below, which may permit the session manager service 120 to further secure the access of the user device to a secure shell instance, for example, by tracking nonce tokens and ensuring that nonce tokens are valid for a single request from the user device 110. Similarly, the nonce and identifier store 170 may also store a login token, provided by an authorization service, that contains a user public key of the user key pair, which may be used to verify the user device 110 during fulfillment of the user request, as described in more detail in reference to FIG. 2, FIG. 5, and FIG. 7, below.

As part of configuring the secure shell instance, the session manager service 120 may select and configure an existing instance from a pool of available instances 180, as described in more detail in reference to the figures below. In some cases, the session manager service may install a configuration file and a delegation token in the selected instance. The configuration may include parameter information including, but not limited to, the instance identifier, the domain identifier, request details (e.g., resource allocations, compartment, tenancy), etc. The delegation token may permit the user device 110 to access IaaS system resources without additional authorization at the level of the instance.

In some embodiments, the configuration parameters installed by the session manager service 120 may be stored in an instance configuration store 190. The instance configuration store 190 may permit a new secure shell instance to be restored and/or reconfigured with request parameters following termination of the secure shell instance. In some embodiments, the secure shell instance will be terminated when the user has completed using it. In some embodiments, the session manager service 120 may instruct the instance manager service 150 to terminate the secure shell instance based on a period of inactivity (e.g., an idle time) of the agent and/or activity via the router 160. The idle time may be provided as part of the configuration parameters. In some embodiments, a user of the user device 110 may request the secure shell instance to be terminated, which may be implemented by the session manager service 120.

As described above, the example system 100 may provide improved security and stability of IaaS systems, at least by permitting a user device to connect to a secure shell instance from a console and/or command line interface. For example, using single use nonce tokens and instances may potentially contain the risk of breakout (where software accesses data and/or resources outside authorized limits). Single use nonce tokens, for example, may be signed by a private key of the user device, which may prevent another user from accessing the secure shell instance. As another example, single use instances may reduce the potential effects of breakout from a container by replacing an instance after it is no longer in use, rather than reusing instances which could potentially compromise subsequent user devices using the same instance.

Figure 2:
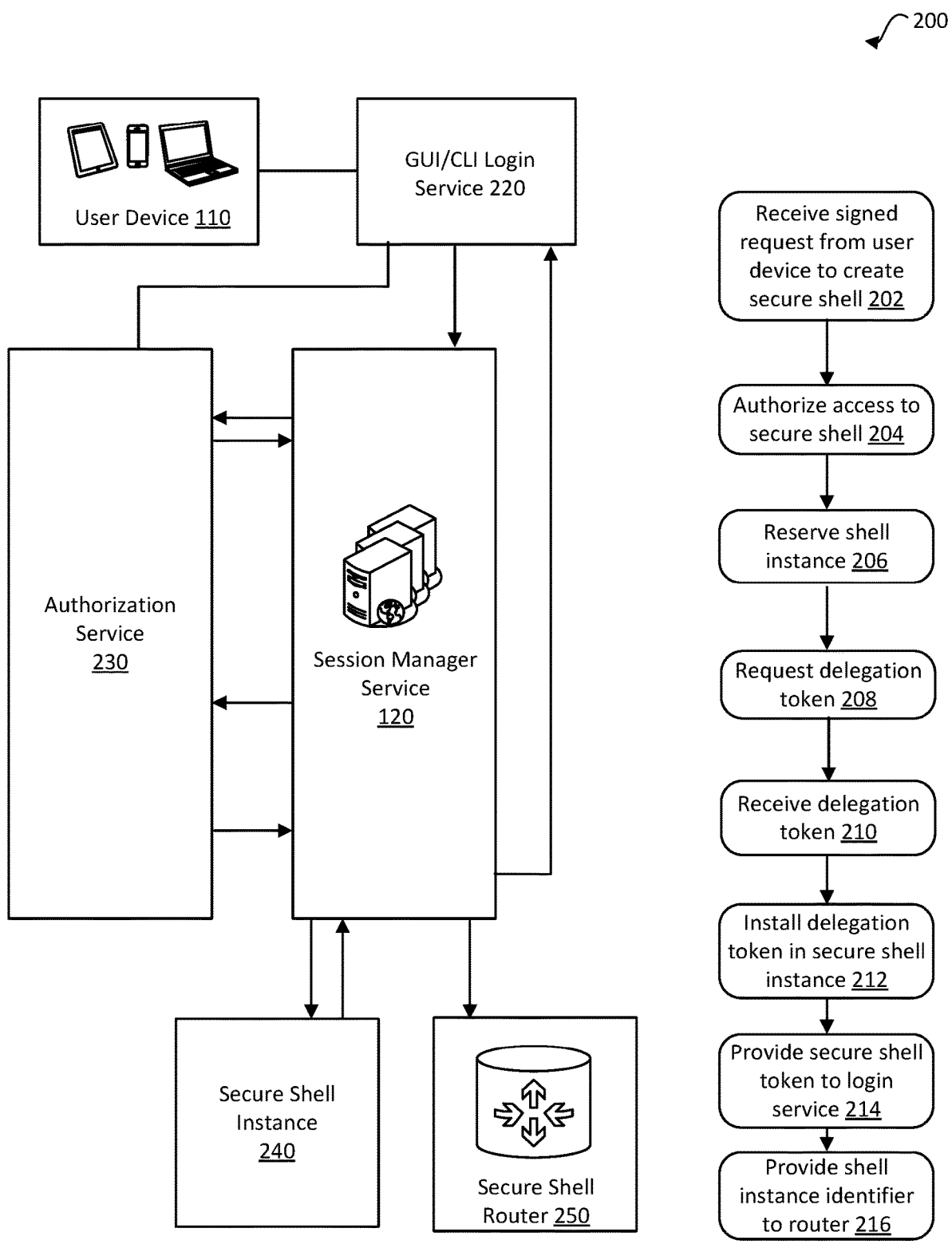
FIG. 2 illustrates an example system for managing a secure shell session, in accordance with one or more embodiments.

FIG. 2 illustrates an example system 200 for managing a secure shell session, in accordance with one or more embodiments. In reference to the system described in FIG. 1 (e.g., example system 100), the example system 200 may include one or more of the constituent elements (e.g., volume manager service 130, instance manager service 150, instances 180, etc. of FIG. 1). In some embodiments, the example system 200 may implement one or more authorization and security protocols as part of providing a secure connection between a user device and a secure shell instance.

In some embodiments, the session manager service 120 may receive a signed request from the user device 110 (e.g., operation 202), where the signed request can be generated by the user device 110. In some embodiments, the user may request a secure shell via a command line interface (CLI) and/or a graphical user interface (GUI), also referred to as a "console" interface. In some cases, the system 200 includes a GUI/CLI login service 220 that may facilitate the communication of identity and authorization information with the session manager service 120. For example, a secure shell request may be signed by a private key generated by the GUI/CLI login service 220 as part of a public/private key pair associated with a user session. For example, a user login and/or identity validation may include generating a temporary public/private key pair that can be used to sign the secure shell request with the private key. The public key may be provided to an authorization service 230 as part of authorizing access of the user device 110 and generating a login token (e.g., an access token), which can be provided to the session manager service 120 to authorize the signed request (e.g., operation 204).

In some embodiments, the authorization service 230 may perform identity authorization for the user device based on username/password account details, as well as authorizing access to a specific IaaS resource and/or a hierarchical resource layer (e.g., a root compartment containing subcompartments associated with IaaS resources). The authorization service 230 may communicate directly with the GUI/CLI login service 220 during an initial step of login/authorization, from which the GUI/CLI login service 220 may provide the login token to the session manager service 120. As described in more detail in reference to FIG. 5 and FIG. 7, below, the session manager service 120 may implement additional operations as part of authorizing access to the secure shell (e.g., operation 204).

In some embodiments, the session manager service 120 may reserve a shell instance for use in creating a secure shell instance 240 (e.g., operation 206). As described in more detail in reference to FIGS. 3-4, below, reserving a shell instance may include one or more operations including, but not limited to, reserving a volume, allocating an instance in the reserved volume, and configuring the allocated instance. The session manager service 120 may receive a shell instance identifier as part of reserving the shell instance, and may provide information including, but not limited to the shell instance identifier, a user identifier associated with the user device 110, and an expiration time (e.g., a validity duration) as part of requesting a delegation token from the authorization service 230 (e.g., operation 208).

The authorization service 230 may generate the delegation token and provide it to the session manager service 120, as an approach to permit the user device 110 to connect securely to the secure shell instance 240 (e.g., operation 210). In some embodiments, the session manager service 120 may configure the reserved shell instance by installing the delegation token received from the authorization service (e.g., operation 212). As described in more detail in reference to FIG. 4, configuring the secure shell instance 240 may include implementing a configuration of the instance (e.g., installing a configuration file including one or more aspects of the signed request).

Following receipt of the delegation token from the authorization service 230, the session manager service 120 may provide a secure shell token to the GUI/CLI login service 220 (e.g., operation 214). As described in more detail in reference to the following paragraphs, additional validation and access control operations may be implemented by the session manager service 120 including, but not limited to generating, signing, and/or storing a nonce token. In some embodiments, the secure shell token may include additional access control elements and may be associated with metadata including the delegation token.

In some embodiments, the session manager service 120 may also provide the shell instance identifier to a secure shell router 250 (e.g., operation 216). In some embodiments, the secure shell router may be an example of the router 160 of FIG. 1. The secure shell router 250 may store the shell instance identifier, and may use the secure shell identifier as part of validating the user device 110 during connection to the secure shell instance 240, as described in more detail in reference to FIG. 3, below.

Figure 3:
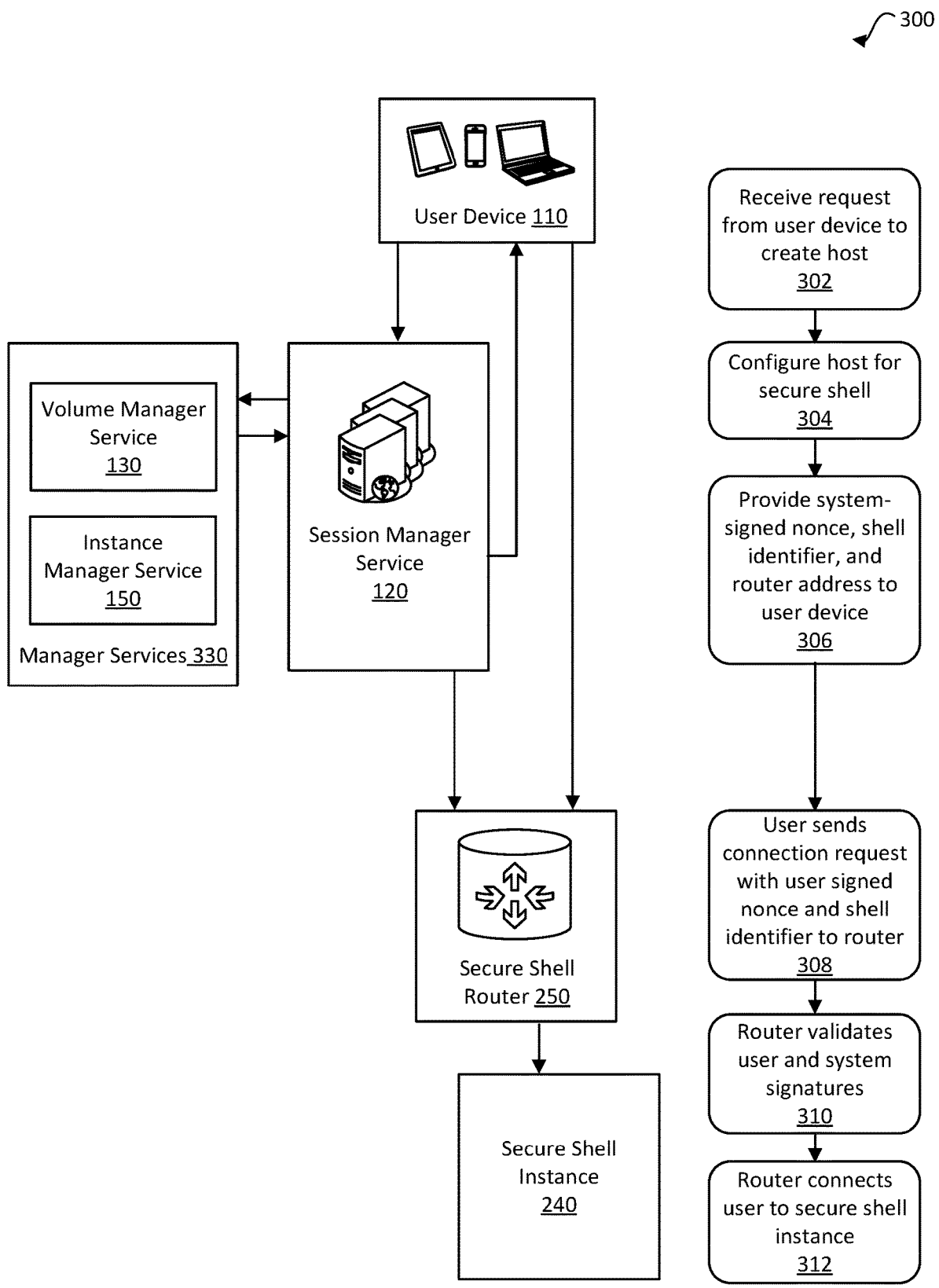
FIG. 3 illustrates an example system for connecting a user device to a secure shell instance, in accordance with one or more embodiments.

FIG. 3 illustrates an example system 300 for connecting a user device to a secure shell instance, in accordance with one or more embodiments. Similarly to the techniques described in reference to FIG. 2, the session manager service 120 may facilitate the connection of the user device 110 to the secure shell router 250, as part of connecting to the secure shell instance 240.

In some embodiments, the session manager service 120 may receive the signed request from the user device 110 to create a secure shell instance, as described in more detail in reference to FIG. 2 (e.g., via the GUI/CLI login service 220 of FIG. 2). The request may include a request for the session manager service 120 to create a host for the secure shell instance (e.g., operation 302). The host may refer to a cloud resource container and/or a volume as implemented in IaaS resources. The request may include the security, authorization information described in reference to FIG. 2, and as such the operations and elements of the system 300 may include one or more elements and/or operations described above (e.g., authorization service 230 of FIG. 2 generating a delegation token).

In some embodiments, the session manager service 120 may configure the host for the secure shell instance (e.g., operation 304). One or more constituent operations included in the configuration of the host are described in more detail in reference to FIG. 4, below. In some embodiments, the session manager service 120 may reserve and allocate an instance using one or more manager services 330 including, but not limited to, the volume manager service 130 and the instance manager service 150, as described in more detail in reference to FIG. 1, above.

As part of creating secure access for the user device 110 to the secure shell instance 240, the session manager service 120 may generate and provide a nonce token, a shell identifier, and a router address to the user device 110 (e.g., operation 306). As described in more detail in reference to FIG. 1, the nonce token may include a web token (e.g., a JWT token) that may include a random string having a predefined number of characters and/or numerals (e.g., an eight character string of letters and numbers). The shell identifier may be included in the secure shell token described in reference to FIG. 2. The router address may identify the secure shell router 250, and may permit the user device to request to connect to the secure shell router 250 via a secure connection (e.g., a WebSocket secure, or "WSS," connection).

In some embodiments, the session manager service 120 may sign the nonce token, for example, using a private key of a key pair identified with the session manager service 120. An additional validation procedure, as described in more detail in reference to FIG. 5, may include validation of the system-signed nonce generated by the session manager service 120 signing the nonce token. To that end, the session manager service 120 may provide the system-signed nonce along with the shell instance identifier to the user device 110 and/or the secure shell router. In some embodiments, when the session manager service 120 provides the system-signed nonce to the user device 110, the user device 110 may sign the system-signed nonce and provide the doubly-signed nonce to the secure shell router 250.

The secure shell router 250 may receive a connection request from the user device 110, which may include a user-signed nonce token (e.g., operation 308). The user-signed nonce token, analogously to the system-signed nonce, may be generated by signing the nonce token with a private key held by the user device 110. As described above, the user private key may form a part of a key pair generated by the GIU/CLI login service (e.g., a temporary public/private key pair), for which the public key may be provided to the session manager service 120 and/or the secure shell router 250.

As part of granting the connection request, the secure shell router 250 may validate the user and system signatures (e.g., operation 310). The secure shell router 250 may validate the nonce token at least in part by checking whether the nonce token is not expired (e.g., if the nonce token includes a validity duration). Validation may be implemented by a request from the session manager service 120 (e.g., the session manager service 120 may ascertain whether the nonce is valid and may provide an indication of validity). The secure shell router 250 may also validate that the nonce token has not been previously used for a connection request, as described in more detail in reference to FIG. 4, below.

In some embodiments, the secure shell router 250 may validate one or more of the signatures at least in part by decrypting the user and system signed nonce tokens using the public keys for the user device 110 and the session manager service 120, respectively. In some embodiments, as when the user device 110 signs the system signed nonce token, the secure shell router 250 may validate the user signature by decrypting the doubly-signed nonce token using the user-public key, and the system signature using the system public key. Decrypting in this way may permit the secure shell router 250 to confirm the nonce value and validate the nonce token. In some embodiments, validation may be achieved, for example, by comparing the decrypted nonce tokens to ascertain whether the nonce tokens match.

Following validation of the nonce token and the user and system signatures, the secure shell router 250 may connect the user device 110 to the secure shell instance 240 (e.g., operation 312). As described in more detail in reference to FIG. 1, above, the secure shell router 250 may provide a WebSocket Secure (wss) connection, which may enable interaction between a web browser (or other client application) and a web server hosting the secure shell instance 240 (e.g., full-duplex communication) via encrypted messages.

Figure 4:
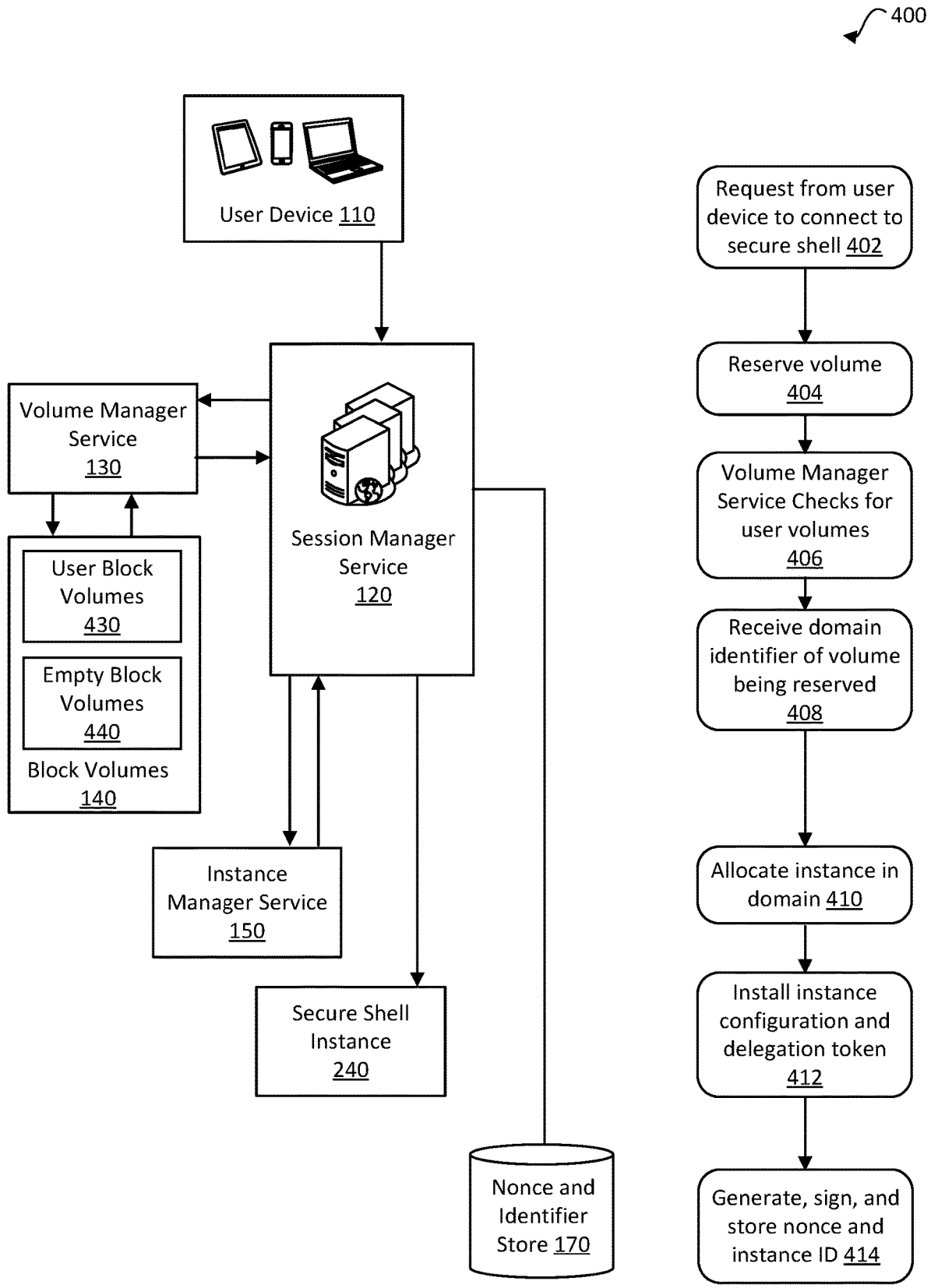
FIG. 4 illustrates an example system for configuring a secure shell instance with a single use nonce token, in accordance with one or more embodiments.

FIG. 4 illustrates an example system 400 for configuring a secure shell instance with a single use nonce token, in accordance with one or more embodiments. As part of reserving and configuring the shell instance, as described in more detail in reference to FIGS. 2-3, above, the session manager service 120 may perform one or more operations in coordination with constituent services of the example system 400.

In some embodiments, the session manager service may receive a request from the user device to connect to a secure shell (e.g., operation 402), as described above in reference to authorizing and validating the user request. In response to receiving the user request, the session manager service 120 may reserve a volume in coordination with the volume manager service 130 (e.g., operation 404). Reserving the volume may involve steps including, but not limited to, ascertaining, by the volume manager service 130, whether one or more block volumes are already associated and/or assigned to the user (e.g., user block volumes 430) of the user device 110 and are available to host the secure shell instance 240 (e.g., operation 406). This may include checking a user identifier (e.g., a username or login ID) against a registry of block volumes managed by the volume manager service 130. Where a user block volume 430 is identified, domain identifier information (e.g., a resource ID, a data-center infrastructure locator, etc.) may be returned to the session manager service 120 to indicate the volume has been reserved to host the secure shell instance 240 (e.g., operation 408).

The volume manager service 130 may find that a user block volume 430 is not available to host the secure shell instance 240. In some embodiments, the volume manager service may reserve an empty block volume 440, which may include one or more of the block volumes 140 that are available at the given data center for which a user may not already be assigned. Similarly, the volume manager service 130 may provide resource identifier information for the session manager service 120 to implement in subsequent operations. For example, the session manager service 120 may allocate an instance in the block volume 140 returned by the volume manager service 130 (e.g., operation 410).

In some embodiments, allocating the instance may include providing the domain identifier to the instance manager service 150. As described in more detail in reference to FIG. 1, the instance manager service 150 may select and reserve an existing instance that is maintained as part of a number of available instances that may be reconfigured for use as secure shell instances. The instance manager service 150 may return an instance identifier (e.g., instance ID) to the session manager service 120, which may permit the session manager service 120 to identify the selected instance in subsequent operations. In some embodiments, selecting and reserving an existing instance, rather than creating and configuring an instance at the time of implementing the connection request, may potentially reduce system latency in processing the connection request.

The session manager service 120 may configure the selected instance at least in part by installing a configuration file (e.g., operation 412). The configuration file may identify IaaS resource details (e.g., compartment, root compartment, domain identifier, etc.) and/or usage details to facilitate completion of the user connection request. The delegation token, as described in more detail in reference to FIG. 2, above, may be generated by an authorization service (e.g., authorization service 220 of FIG. 2). Installing the delegation token on the secure shell instance 240 may permit the user device 110 to access IaaS system resources directly via the secure shell instance 240, without additional requests to the authorization service for each resource and/or request.

The example system 400 may include the additional validation operations described in more detail in reference to FIG. 3. For example, the session manager service 120 may generate, sign, and store a nonce token (e.g., a temporary JWT token) in nonce and identifier store 170, as part of implementing a single-use nonce approach as part of the nonce validation protocol (e.g., operation 414). For example, the nonce and identifier store 170 may contain a nonce table that includes a list of nonce tokens (e.g., nonce "key" sequences that may be used to track whether a nonce is issued and valid) and may include the associated instance identifier information for each nonce, as an approach for attributing a nonce token to a secure shell instance 240 when implementing one or more validation operations, as described in more detail in reference to FIG. 5, below. Since, in some cases, a nonce token may be temporary, the nonce table may include timing information including, but not limited to, issue time, validity period, etc. In this way, a nonce token may be found and its validity ascertained as part of fulfilling a connection request. In some embodiments, after the user device 110 is connected to the secure shell instance 240 (e.g., operation 314 of FIG. 3), the corresponding nonce token may be removed from the nonce table in the nonce and identifier store 170. In such cases, the session manager service 120 may permit nonce tokens to be single use, which may reduce the risk of unauthorized access to the secure shell instance 240 (e.g., by "spoofing" using a valid nonce token).

Figure 5:
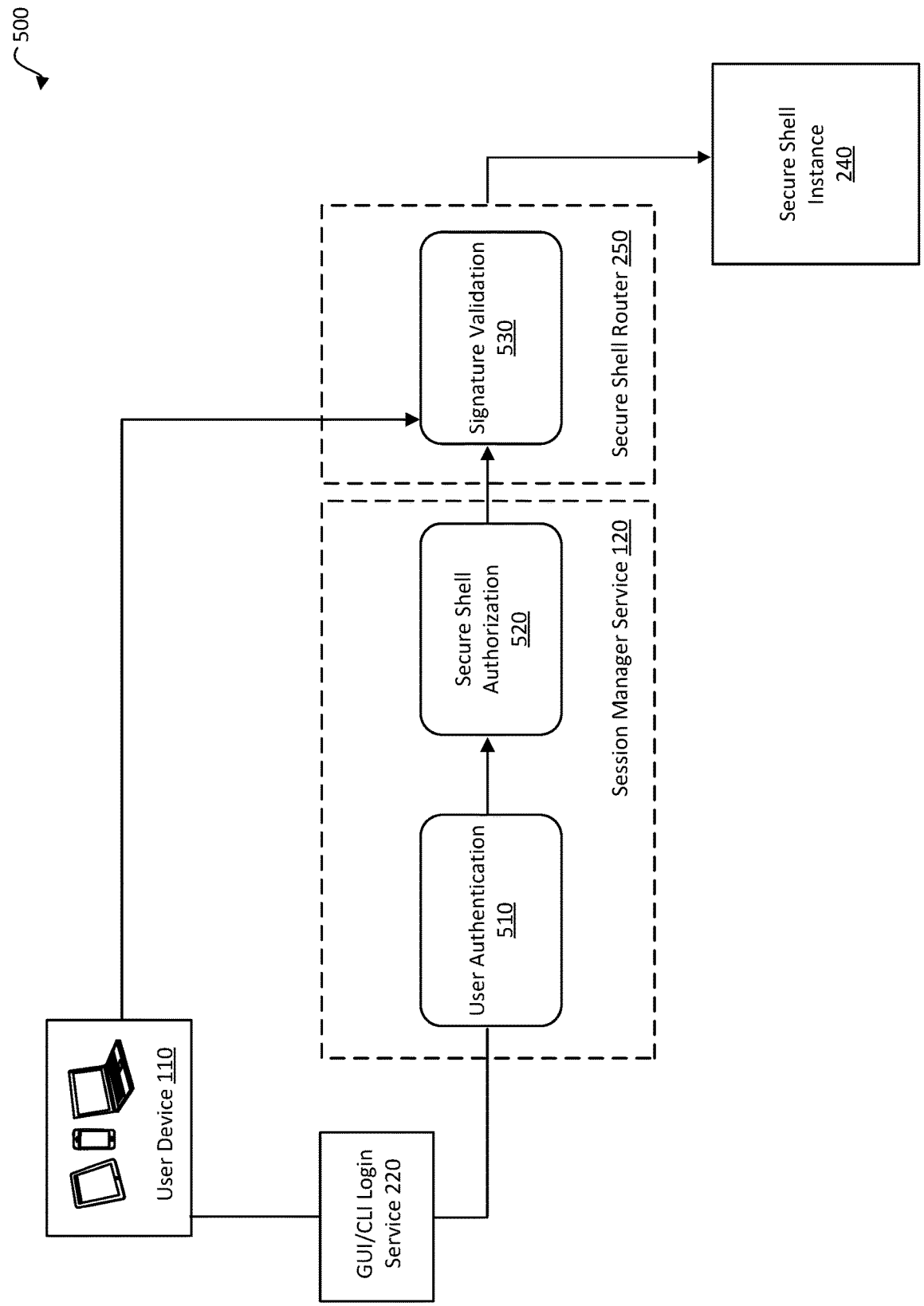
FIG. 5 illustrates an example technique for authorizing a user device connecting to a secure shell instance, in accordance with one or more embodiments.

FIG. 5 illustrates an example technique 500 for authorizing a user device connecting to a secure shell instance, in accordance with one or more embodiments. In connection with the systems described above, one or more access control operations may be implemented as part of creating a secure connection between the user device 110 and the secure shell instance 240. The operations described in reference to managing a secure shell session may include one or more of the operations described in reference to the preceding figures, for example, using user ID login controls, delegation tokens, and/or signed nonce tokens with signature validation.

In some embodiments, the session manager service 120 receives a signed request to create the secure shell instance 240, the request being created and signed by the user device 110. As described in more detail in reference to FIG. 2, the request may be received from the GUI/CLI login service 220, which may generate the key pair used by the user device 110 to sign the request.

The session manager service 120 may authenticate the user request using user login or IaaS ID authentication, as described in more detail in reference to FIG. 2 (e.g., operation 510). For example, the identity of the user may be authenticated by an authorization service (e.g., authorization service 230), at least in part by authorizing a username/password in combination with a data center identifier or other IaaS resource access parameter. The authorization service may generate a login token that includes the user public key of the key pair generated by the GUI/CLI login service 220. The authorization service may provide the login token to the user device and/or the GUI/CLI login service 220 after signing the login token with a private key of the authorization service. In this way, the session manager service 120 may authenticate both the signed request from the user device 110 and the user identity by requesting the authorization service public key from the authorization service. In some embodiments, the session manager service 120 may also extract the user public key from the login token, and may use the user public key to verify the signature on the signed request.

In some embodiments, the session manager service 120 may authorize the secure shell instance 240 (e.g., operation 520). As described in more detail in reference to FIG. 2, authorizing the secure shell instance 240 may include requesting a delegation token from the authorization service. In some cases, delegation token may be issued in response to authorizing access to IaaS system resources based at least in part on a combination of a user ID, an instance identifier, and whether the request has expired (e.g., a temporary key pair is still valid and/or if the request itself has expired). Receiving the delegation token may permit the session manager service 120 to configure the secure shell instance 240 to access IaaS system resources (e.g., compute resources, core services, storage resources, etc.) without further authentication and/or authorization, once a secure connection between the secure shell instance 240 and the user device 110 has been established.

In some embodiments, the session manager service 120 may generate a nonce token and provide the nonce token, as well as other information, to the user device 110 and or the GUI/CLI login service 220. In some embodiments, the session manager service 120 provides a system-signed nonce token to the secure shell router 250. In some embodiments, the session manager service provides the system-signed nonce token to the user device 110, as part of signature validation (e.g., operation 530). The user device 110 may sign the system-signed nonce, generating a doubly-signed nonce. In so doing, the session manager service 120 may also provide the public key matched to the private key used to sign the system-signed nonce token. The secure shell router 250 may receive the user-signed nonce token from the user device 110, and may validate the signatures to authenticate the request. In some embodiments, validating the signatures may include decrypting the doubly-signed nonce using the user public key and the system public key to verify the user signature and the system signature, respectively. Validation may include comparing the decrypted nonce to the system-generated nonce, for example, as stored in a database of nonce tokens (e.g., nonce and identifier store 170 of FIG. 1). In some embodiments, validating the signatures may include decrypting the user-signed nonce token and the system-signed nonce token and comparing the nonce string included in the nonce tokens to confirm a match.

In an example, the secure shell router 240, on connecting with the session manager service 120 and receiving the nonce token, may extract the expiration from the nonce token. The lifetime of the nonce may be configurable (e.g., an expiration time may be five minutes or any other number of seconds, minutes, or hours). If the nonce token has expired, the secure shell router 250 may return an error rather than establishing the secure connection. If the nonce token hasn't expired, the secure shell router 250 may verify the nonce token (e.g., by signature validation), and if invalid the secure shell router 250 may return the same error. In some embodiments, the secure shell router 250 may invalidate a valid nonce token to prevent reuse of the same nonce token. After the three access control operations are concluded successfully, the secure shell router 250 may connect the user device 110 to the secure shell instance 240 (e.g., via a wss connection).

Figure 6:
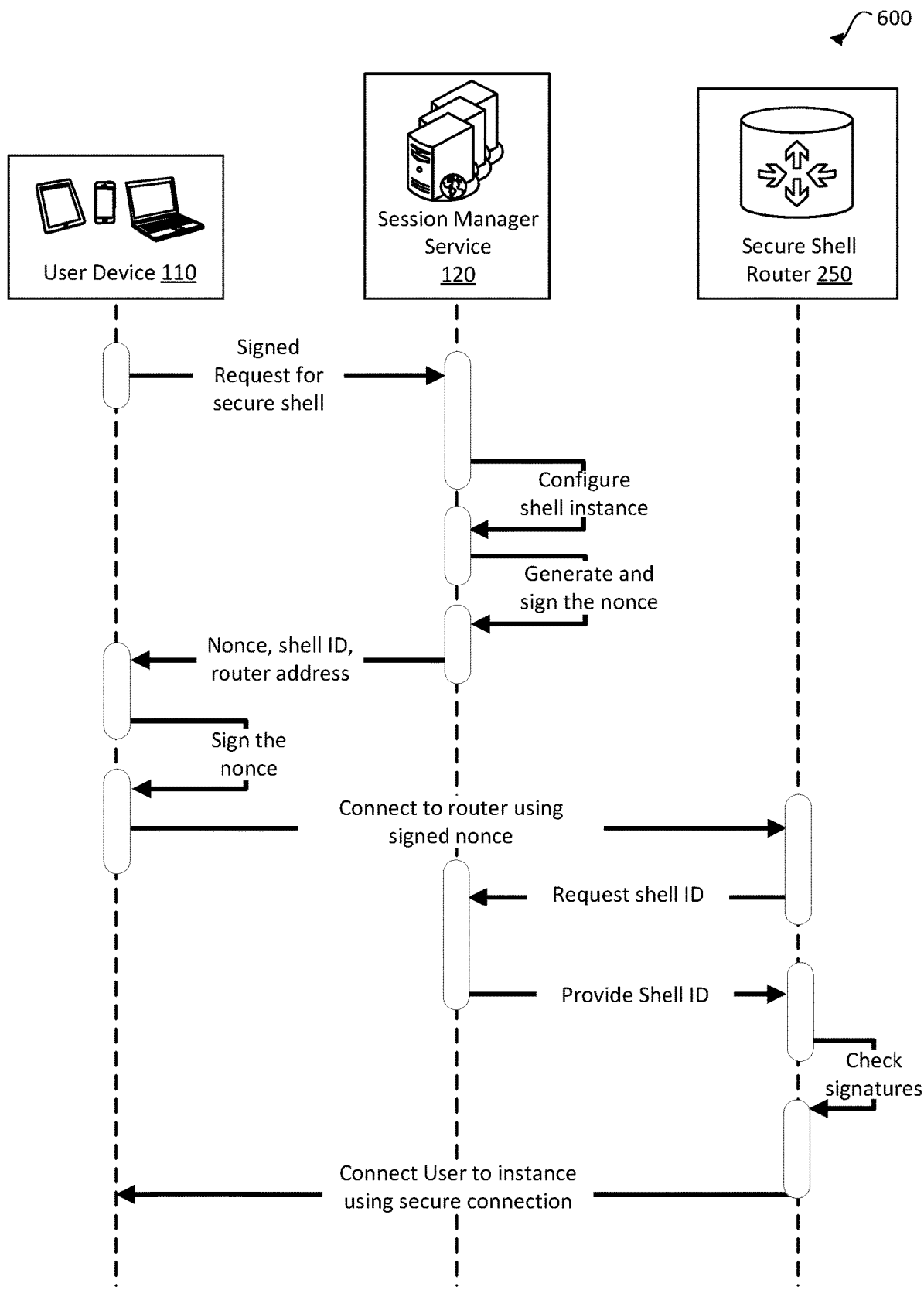
FIG. 6 illustrates a sequence diagram showing an example data flow by which a user device is connected to a secure shell instance, in accordance with one or more embodiments.

FIG. 6 illustrates a sequence diagram showing an example data flow 600 by which a user device is connected to a secure shell instance, in accordance with one or more embodiments. A user of the user device 110 requests to connect to a secure shell instance through a GUI and/or a CLI, and the session manager service 120 coordinates the IaaS resources, configures the instance, and provides for a nonce to be used for validating the user device 110 to the secure shell router 250.

In data flow 600, the user device 110 (which may be an example of user device 110 of FIG. 1) may submit a request to connect to a secure shell instance. as described in more detail in reference to FIG. 2, the request may be submitted through a GUI/CLI login service (e.g. GUI/CLI login service 210 of FIG. 2) and may be received by the session manager service 120. The request may be signed by a private key of a public/private key pair generated by the GUI/CLI login service. The key pair may be temporary, and the validity of the key pair may serve as one of the validation parameters of the signed request, as described in more detail in reference to FIG. 5, above, and FIG. 7, below.

Upon receiving the signed request, the session manager service 120 may configure a shell instance, as described in more detail in reference to the figures above. Configuring a shell instance may include multiple operations including, but not limited to reserving a volume, allocating an instance from a number of available instances that are created for the purpose of configuring a secure shell instance, and installing a configuration file on the allocated instance that may include a delegation token. As described in more detail in reference to FIG. 7, below, one or more operations may be included to authenticate the user identity and to authorize access to IaaS system resources via the secure shell instance.

Configuring the shell instance may include receiving, by the session manager service 120, a shell instance identifier from an instance manager service (e.g., an IaaS resource identifier). With the shell instance identifier, the session manager service 120 may generate a nonce token, and may receive a router address corresponding to the secure shell router 250 (which may be an example of the secure shell router 250 of FIG. 2). The session manager service 120 may sign the nonce token using a private key of a public/private key pair held by the session manager service 120. The session manager service 120 may provide the system-signed nonce, the shell instance identifier, and the router address to the user device 110 (e.g., via the GUI/CLI login service), which may permit the user device to address the secure shell router 250 as part of connecting to the secure shell instance. In some embodiments, the session manager service 120 may provide an unsigned nonce token to the user device 110. In such cases, the session manager service 120 may sign the nonce token to generate a system-signed nonce token.

Upon receiving the information from the session manager service 120 (e.g., the nonce token, the shell instance identifier, and the router address), the user device 110 may sign the nonce token (e.g., using the private key of the key pair used to sign the request). The user device 110 may then connect to the secure shell router 250 (e.g., at the router address), and may provide the user-signed nonce token and the shell instance identifier. In some embodiments, the user-signed nonce token includes both a user signature and a system signature, thereby permitting signature validation of both the user device 110 and the session manager service 120 using a single, doubly-signed, nonce token.

To validate the request received from the user device 110, the secure shell router 250 may request the shell identifier associated with the request and a system-signed nonce from the session manager service 120. In response, the session manager service 120 may provide the shell instance identifier and the system-signed nonce to the secure shell router 250. In some embodiments, as when the session manager service 120 provides a system-signed nonce to the user device 110, the secure shell router 250 may not request a system signed nonce from the session manager service 120.

As described in more detail in reference to FIG. 5, the secure shell router may check the signatures by decrypting the signed nonce token using the user public key and the system public key. Validation may also include comparing the shell instance identifier received from both the user device 110 and the session manager service 120.

Upon validating the signatures, the secure shell router 250 may connect the user device 110 to the secure shell instance (e.g., secure shell instance 240 of FIG. 2) by an encrypted connection (e.g., a wss connection). In some embodiments, as when the session manager service 120 stores the nonce token and the corresponding shell instance identifier in a data store, the session manager service 120 or the secure shell router 250 may remove the entry for the nonce token from the data store, for example, after validating the signed nonce token and connecting the user device 110 to the secure shell instance.

Figure 7:
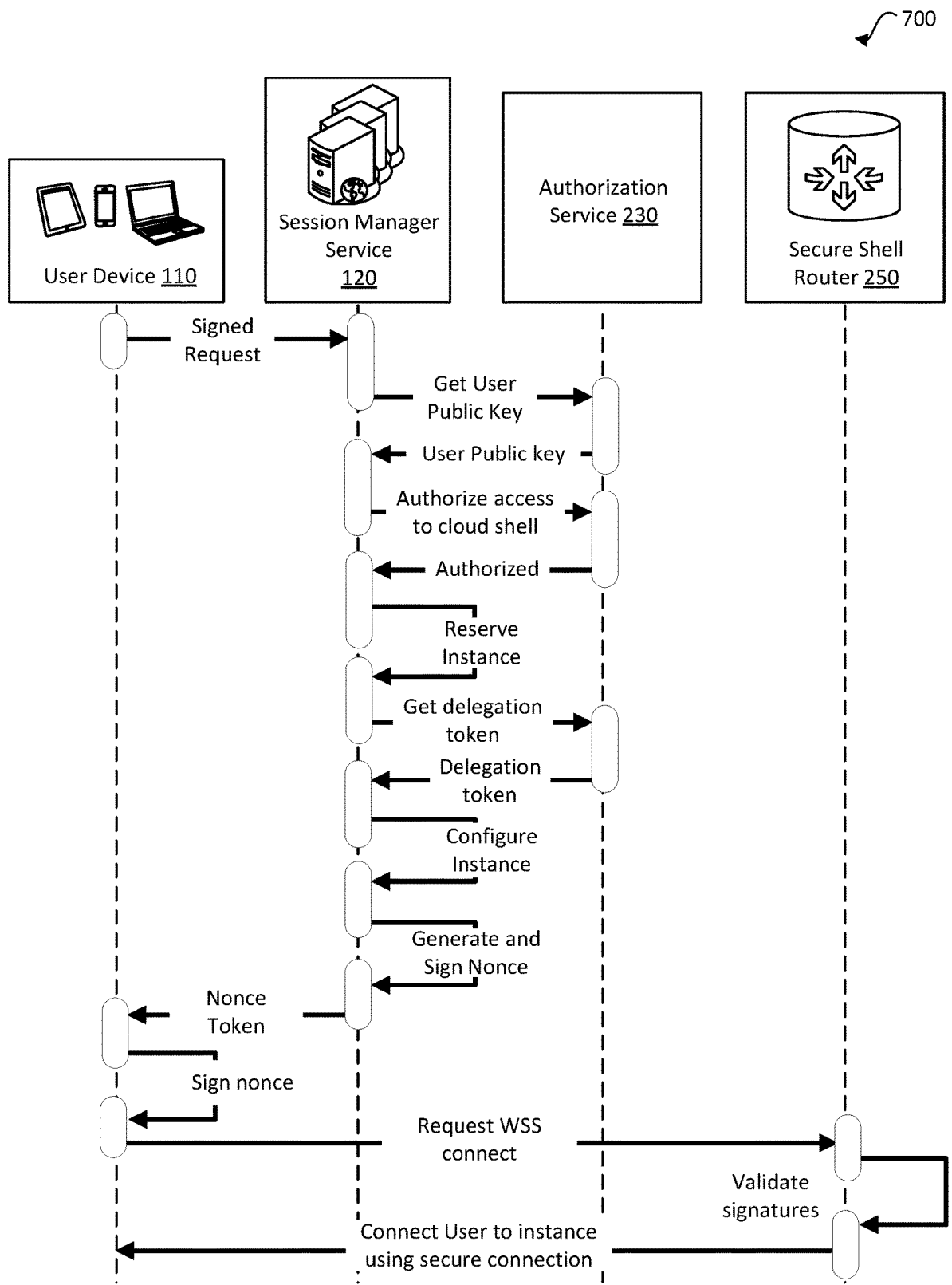
FIG. 7 illustrates a sequence diagram showing an example data flow by which a user device is connected to a secure shell instance using an authorization service, in accordance with one or more embodiments.

FIG. 7 illustrates a sequence diagram showing an example data flow 700 by which a user device is connected to a secure shell instance using an authorization service 230, in accordance with one or more embodiments. The authorization service 230 may include, but is not limited to, a general user identity authorization service that may be used to authorize access to IaaS resources, for example, by authorizing login credentials. Involvement of the authorization service 230 may include one or more preliminary identity verification and access authorization operations, as described in more detail in reference to FIG. 5, above.

In data flow 700, session manager service 120 receives the signed request from the user device 110, as described in reference to the preceding figures. Upon receiving the signed request, the session manager service 120 may request an authorization service public key from the authorization service. The authorization service public key may be used to decrypt a login token received with the signed request (e.g., the login token may have been signed by the authorization service private key paired to the corresponding public key), to identify user identifier information (e.g., username/password combinations, request identifier information, etc.). The authorization service 230 may provide the public key to the session manager service 120, which may then request authentication of the user identity using identifier information from the login token. The authorization service 230 may confirm the user identity.

Upon receiving authentication of the identity of the user device 110, the session manager service 120 may request a delegation token from the authorization service 230. The delegation token, as described in more detail in reference to FIG. 2, may be used by the session manager service to indicate that the user device is authorized to connect to IaaS system resources via the secure shell instance that has been configured to fulfill the signed request. Authorization of the user to connect to IaaS system resources via the secure shell may include providing IaaS resource information included in the signed request, such that the authorization service 230 may determine whether the user device 110 is authorized to connect to the particular resources being requested.

Upon authorizing the user device 110, the authorization service 230 may generate and provide the delegation token to the session manager service 120. The session manager service 120 may install the delegation token on the secure shell instance (e.g., secure shell instance 240 of FIG. 2). Configuring the secure shell instance may include additional and/or alternative operations, as described above.

As described in reference to FIG. 6, the session manager service 120 may generate a nonce token, sign the nonce token using a system private key of a public/private key pair of the session manager service 120 to generate a signed nonce token, and provide the signed nonce token along with the shell instance identifier and the router address corresponding to the secure shell router 250 (e.g., a "router endpoint") to the user device 110. The user device 110 may sign the system-signed nonce token and send a request (e.g., a request to establish a WebSocket Secure, or "wss" connection) including the user-signed nonce token to the secure shell router as part of a validation process. The user-signed nonce, also signed by the session manager service, may be used by the secure shell router 250 to validate the request. In some embodiments, as described in more detail in reference to FIG. 6, the session manager service 120 may send an unsigned nonce to the user device 110, such that both a user-signed nonce and a system-signed nonce are provided to the secure shell router 250 for validation.

The secure shell router 250 may validate the signatures, as described in more detail in reference to FIG. 6, above. Upon validating the system and user signatures and authenticating the nonce token and the shell instance identifier, the secure shell router may connect the user device to the secure shell instance.

Figure 8:
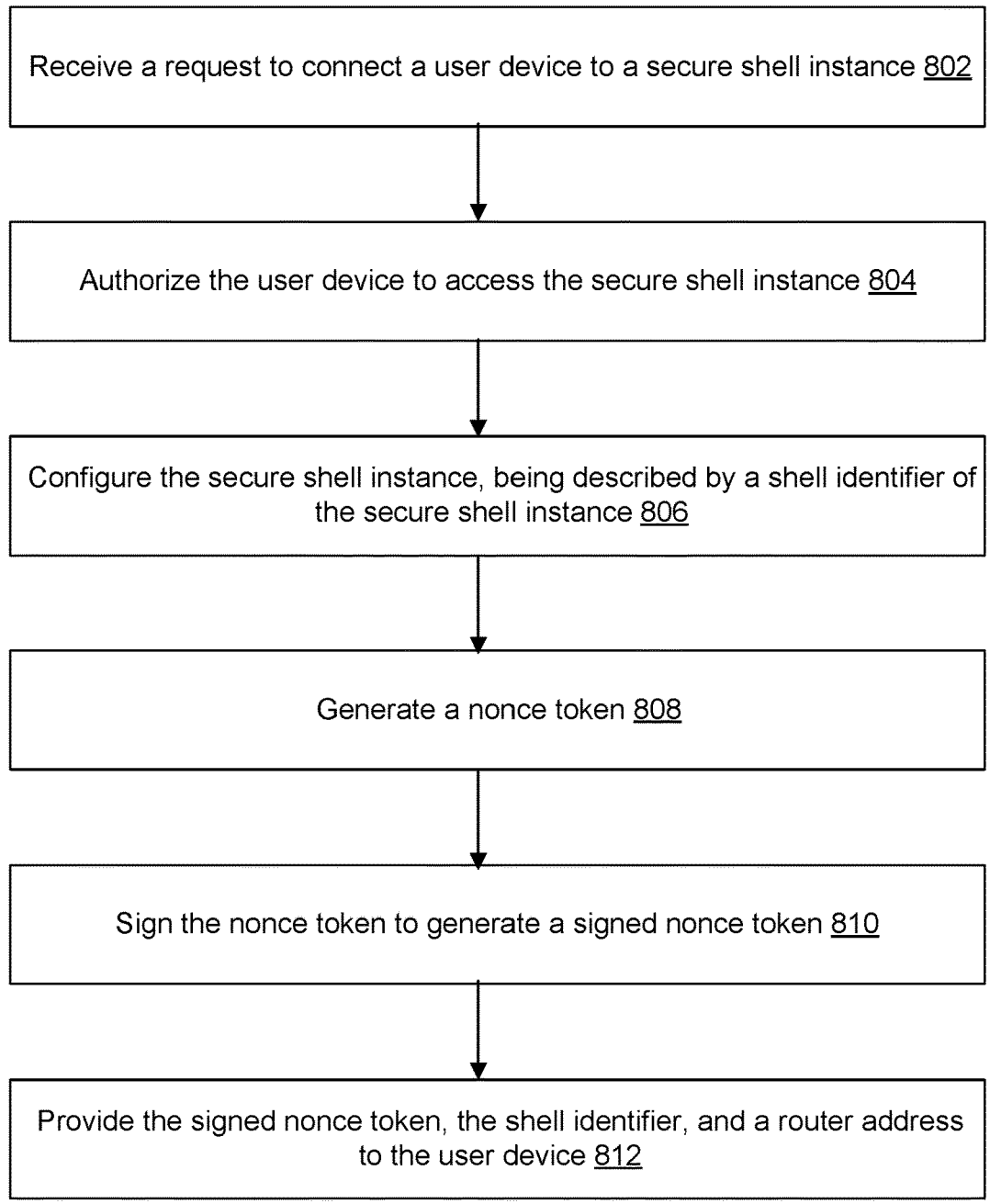
FIG. 8 illustrates an example flow for managing a secure shell session, in accordance with one or more embodiments.

FIG. 8 illustrates an example flow 800 for managing a secure shell session, in accordance with one or more embodiments. The operations of the flow can be implemented as hardware circuitry and/or stored as computer-readable instructions on a non-transitory computer-readable medium of a computer system, such as the session manager service 120 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 800 includes an operation 802, where the computer system receives a request to connect a user device (e.g., user device 110 of FIG. 1) to a secure shell instance (e.g., secure shell instance 240 of FIG. 2). As described in more detail in reference to FIG. 2 and FIG. 6, the request may be a signed request generated by the user device and/or by a login service (e.g., GUI/CLI login service 210 of FIG. 2), and provided to the session manager service for implementation. The request may be signed by a private key generated by the GUI/CLI login service, and may be used to authenticate the identity of the user device, as described in more detail in reference to FIG. 2 and FIG. 7.

In an example, the flow 800 includes an operation 804, where the computer system authorizes the user device to access the secure shell instance. As described in more detail in reference to FIG. 9, authorizing the user device may include one or more operations involving an external authorization service (e.g., authorization service 230 of FIG. 2). The authorization service may provide authentication of the user (e.g., by validating user identifier such as username/password), and may authorize access to the IaaS resource described in the request.

In an example, the flow 800 includes an operation 806, where the computer system configures the secure shell instance, being described by a shell identifier of the secure shell instance. In some embodiments, configuring the secure shell instance may include, but is not limited to, reserving a block volume, allocating an instance in the block volume, and installing a configuration file and a delegation token on the instance. Optionally, reserving the block volume may include checking whether the user device is already associated with a block volume (e.g., user block volumes 430 of FIG. 4) or is not yet associated with a block volume, in which case an empty block volume (e.g., empty block volumes 440 of FIG. 4) may be reserved. Optionally, allocating an instance may include selecting an instance from a plurality of available instances. Maintaining the plurality of available instances, for example with one or more default configurations that may be reconfigured by installing the configuration file, may permit the session manager service to respond more rapidly (i.e., with lower latency) to the request. In some embodiments, reserving a block volume and allocating an instance may include communicating with a volume manager service (e.g., volume manager service 130 of FIG. 1) and an instance manager service (e.g., instance manager service 150 of FIG. 1).

In an example, the flow 800 includes an operation 808, where the computer system generates a nonce token. The nonce token may be a web token (e.g., a JSON Web Token, or JWT token) that includes one or more types of information. Optionally, the nonce token includes a key sequence that may be used to track whether the nonce is valid for use. For example, the session manager service may store the nonce token in a data store (e.g., nonce and identifier store 170 of FIG. 1). In some embodiments, the nonce token includes a random sequence of letters and/or numbers (e.g., 8 alphanumeric characters), that may be used to validate the request.

In an example, the flow 800 includes an operation 810, where the computer system signs the nonce token to generate a signed nonce token. As described in more detail in reference to FIG. 3, the system may sign the nonce token using a private key of a public/private key pair (e.g., asymmetric encryption). In this way, the signed nonce token may be encrypted at the time of transmission to the user device (e.g., user device 110 of FIG. 1).

In an example, the flow 800 includes an operation 812, where the computer system provides the signed nonce token, the shell identifier, and a router address to the user device. as described in more detail in reference to FIG. 6, the user device may send a secure connection request (e.g., a WSS connection request) to a secure shell router (e.g., secure shell router 250 of FIG. 2). The user device may sign the nonce token with a private key (e.g., the same key used to sign the request), and may provide the public key paired to the private key to the secure shell router at the router address. The user device may also provide the shell identifier to the secure shell router, as part of the connection request. Optionally, the computer system may provide the shell identifier to the secure shell router at the router address, as an additional validation parameter implemented by the secure shell router.

Figure 9:
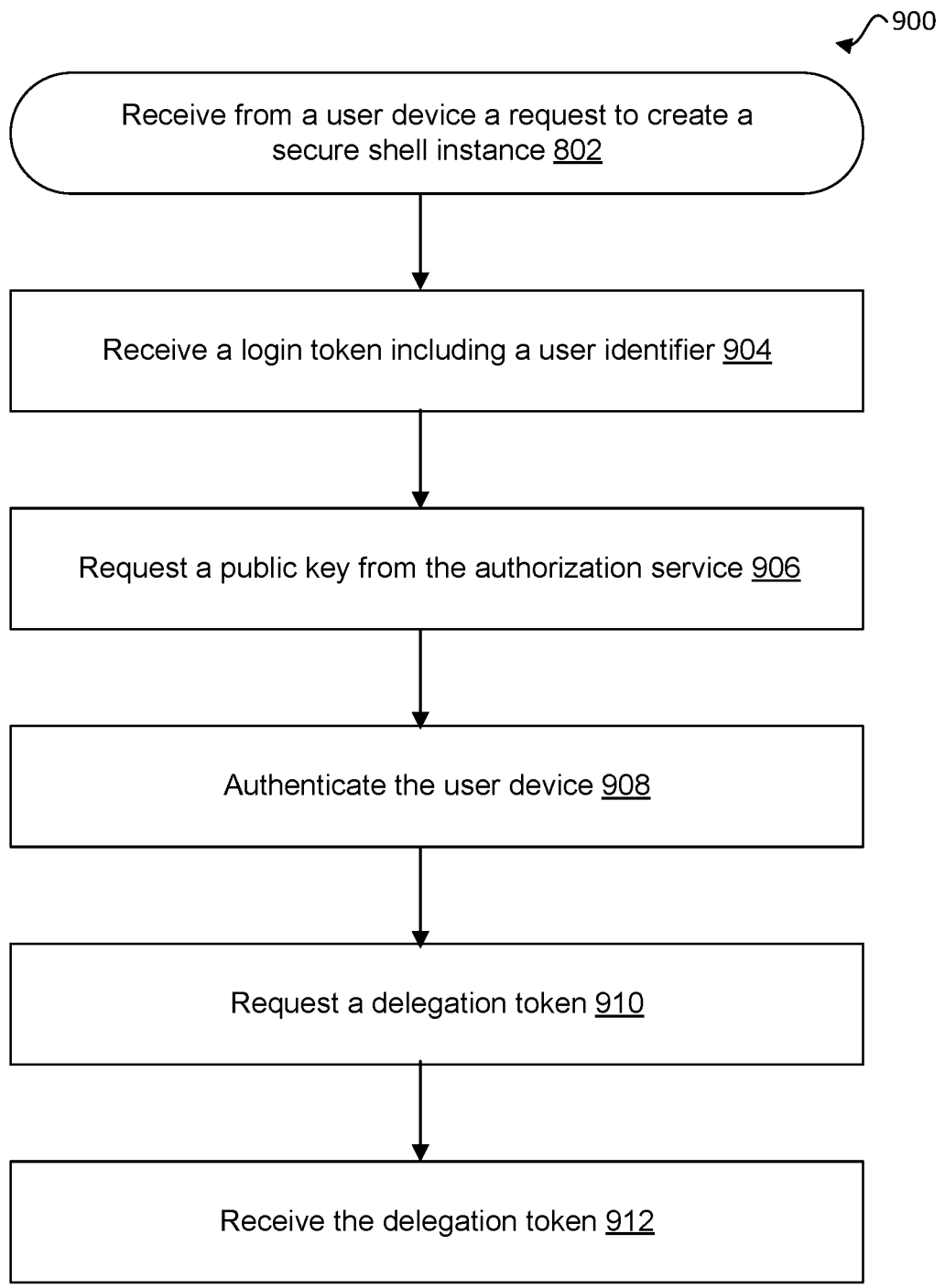
FIG. 9 illustrates an example flow for configuring a secure shell instance with a single use nonce token, in accordance with one or more embodiments.

FIG. 9 illustrates an example flow 900 for configuring a secure shell instance with a single use nonce token, in accordance with one or more embodiments. The operations of the flow can be implemented as hardware circuitry and/or stored as computer-readable instructions on a non-transitory computer-readable medium of a computer system, such as the session manager service system 120 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 900 begins following operation 802 of FIG. 8, where the computer system receive from a user device a request to create a secure shell instance. In particular, the computer system (e.g., the session manager service 120 of FIG. 1), may implement one or more operations to authenticate and/or authorize the user device from which the request was received, in communication with an authorization service (e.g., authorization service 230 of FIG. 2), as part of enabling the session manager service to proceed with the operations described in FIG. 8.

In an example, the flow 900 includes an operation 904, where the computer system receives a login token including a user identifier. As described in more detail in reference to FIG. 7, the session manager service may request the authorization service to authenticate the identity of the user device (e.g., as represented in the signed request), and to authorize access for the user device to the IaaS resource identified in the request. As part of authenticating the user identity, the session manager service may receive the login token from the user device. The login token may include user information (e.g., username/password, login credentials, expiration information of a login session, etc.) as well as the user public key paired to the user private key used to sign the request and/or the nonce token by the user device. The login token may be signed by a private key held by the authorization service.

In an example, the flow 900 includes an operation 906, where the computer system requests a public key from the authorization service. The public key, being used to sign the login token, may provide The session manager service may request a public key from the authorization service to decrypt the login token, as part of authenticating the user device. For example, the login token may provide user identifier information used to authenticate the user device (e.g., a device identifier or session identifier information).

In an example, the flow 900 includes an operation 908, where the computer system authenticates the user device. In some embodiments, the session manager service may extract user identifier information from the login token, and may compare the user identifier information to the information provided with the request.

In an example, the flow 900 includes an operation 910, where the computer system requests a delegation token. The delegation token, as described in more detail in reference to FIG. 2, may be generated by the authorization service and provided to the session manager service after the user device has been authorized to access the IaaS resource identified in the user request to connect to the secure shell instance. For example, the session manager service may provide user identifier information, instance identifier information, expiration information, or the like, based at least in part on which the authorization service may determine whether the delegation token will be generated.

In an example, the flow 900 includes an operation 912, where the computer system receives the delegation token. The session manager service may use the delegation token to allow the secure shell router to grant access to the user device to IaaS resources without additional authorization by the authorization service, for example, by installing the delegation token on the secure shell instance, for example, as part of configuring the secure shell instance, as described in more detail in reference to FIG. 2, above.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
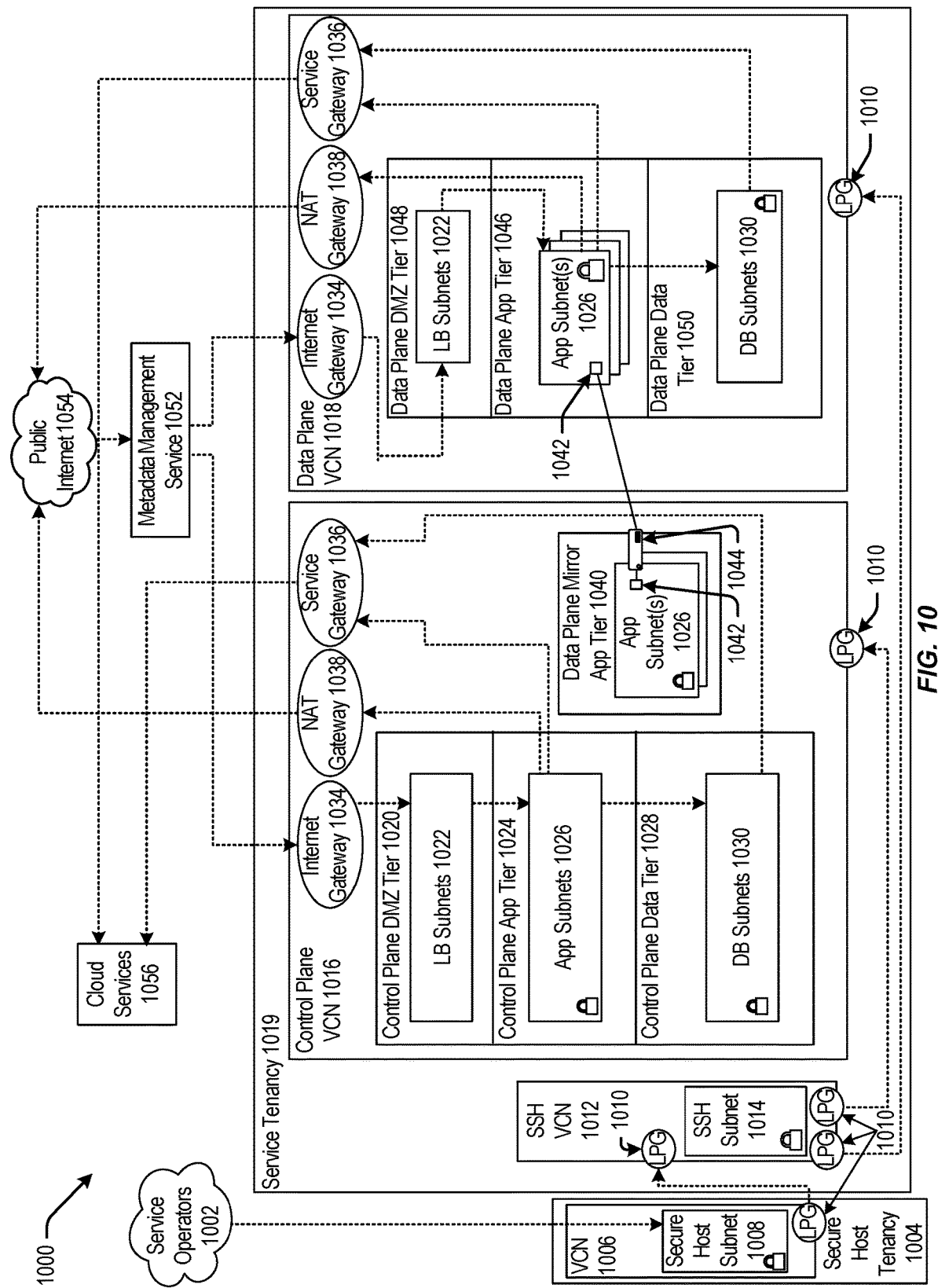
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep security breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plan VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Memory that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of security, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
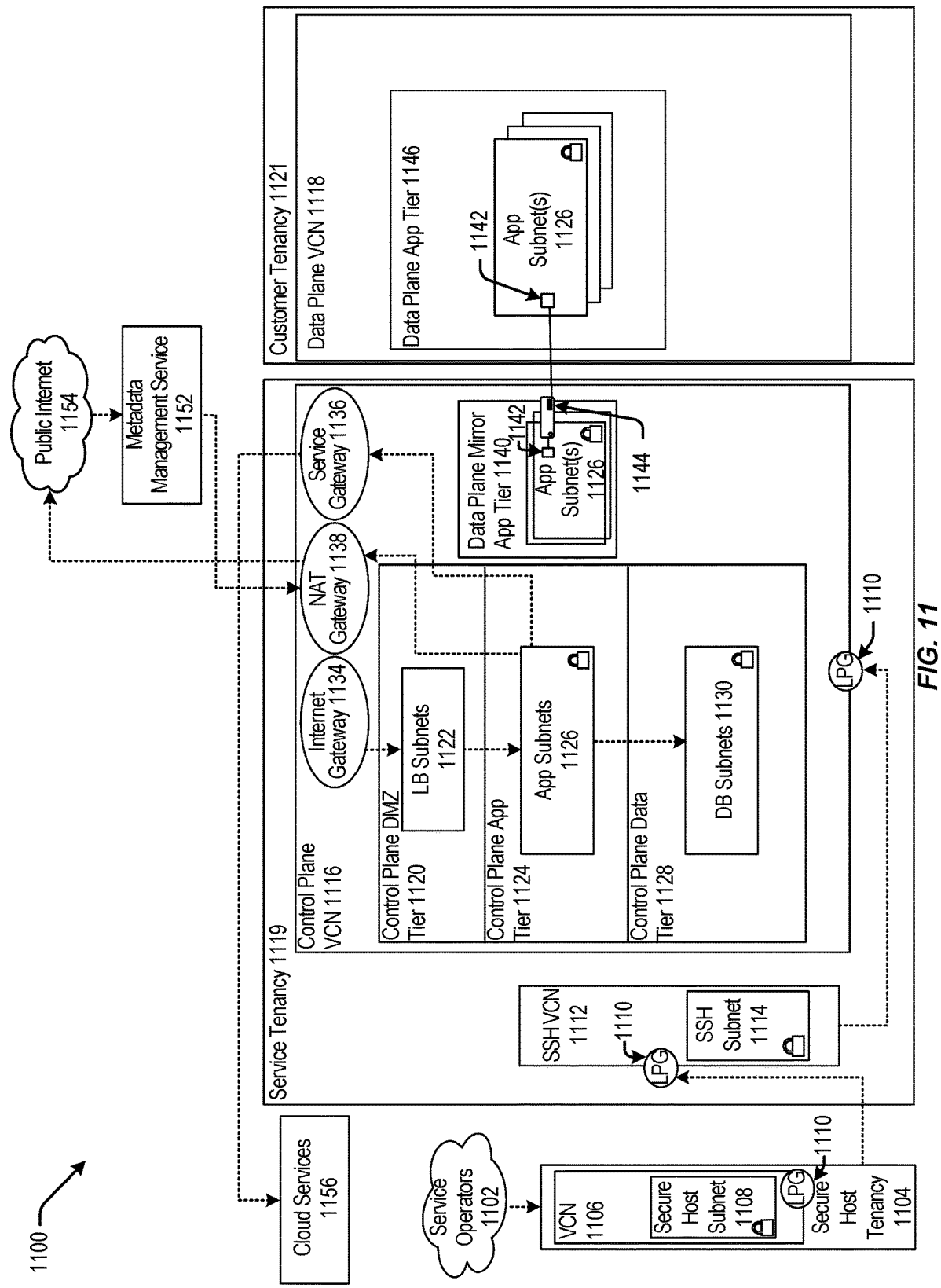
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 1002 of FIG. 10) can be communicatively coupled to a secure host tenancy 1104 (e.g. the secure host tenancy 1004 of FIG. 10) that can include a virtual cloud network (VCN) 1106 (e.g. the VCN 1006 of FIG. 10) and a secure host subnet 1108 (e.g. the secure host subnet 1008 of FIG. 10). The VCN 1106 can include a local peering gateway (LPG) 1110 (e.g. the LPG 1010 of FIG. 10) that can be communicatively coupled to a secure shell (SSH) VCN 1112 (e.g. the SSH VCN 1012 of FIG. 10) via an LPG 1010 contained in the SSH VCN 1112. The SSH VCN 1112 can include an SSH subnet 1114 (e.g. the SSH subnet 1014 of FIG. 10), and the SSH VCN 1112 can be communicatively coupled to a control plane VCN 1116 (e.g. the control plane VCN 1016 of FIG. 10) via an LPG 1110 contained in the control plane VCN 1116. The control plane VCN 1116 can be contained in a service tenancy 1119 (e.g. the service tenancy 1019 of FIG. 10), and the data plane VCN 1118 (e.g. the data plane VCN 1018 of FIG. 10) can be contained in a customer tenancy 1121 that may be owned or operated by users, or customers, of the system.

The control plane VCN 1116 can include a control plane DMZ tier 1120 (e.g. the control plane DMZ tier 1020 of FIG. 10) that can include LB subnet(s) 1122 (e.g. LB subnet(s) 1022 of FIG. 10), a control plane app tier 1124 (e.g. the control plane app tier 1024 of FIG. 10) that can include app subnet(s) 1126 (e.g. app subnet(s) 1026 of FIG. 10), a control plane data tier 1128 (e.g. the control plane data tier 1028 of FIG. 10) that can include database (DB) subnet(s) 1130 (e.g. similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g. the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g. the service gateway of FIG. 10) and a network address translation (NAT) gateway 1138 (e.g. the NAT gateway 1038 of FIG. 10). The control plane VCN 1116 can include the service gateway 1136 and the NAT gateway 1138.

The control plane VCN 1116 can include a data plane mirror app tier 1140 (e.g. the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g. the VNIC of 1042) that can execute a compute instance 1144 (e.g. similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g. the data plane app tier 1046 of FIG. 10) via the VNIC 1142 contained in the data plane mirror app tier 1140 and the VNIC 1142 contained in the data plan app tier 1146.

The Internet gateway 1134 contained in the control plane VCN 1116 can be communicatively coupled to a metadata management service 1152 (e.g. the metadata management service 1052 of FIG. 10) that can be communicatively coupled to public Internet 1154 (e.g. public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g. cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s) 1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
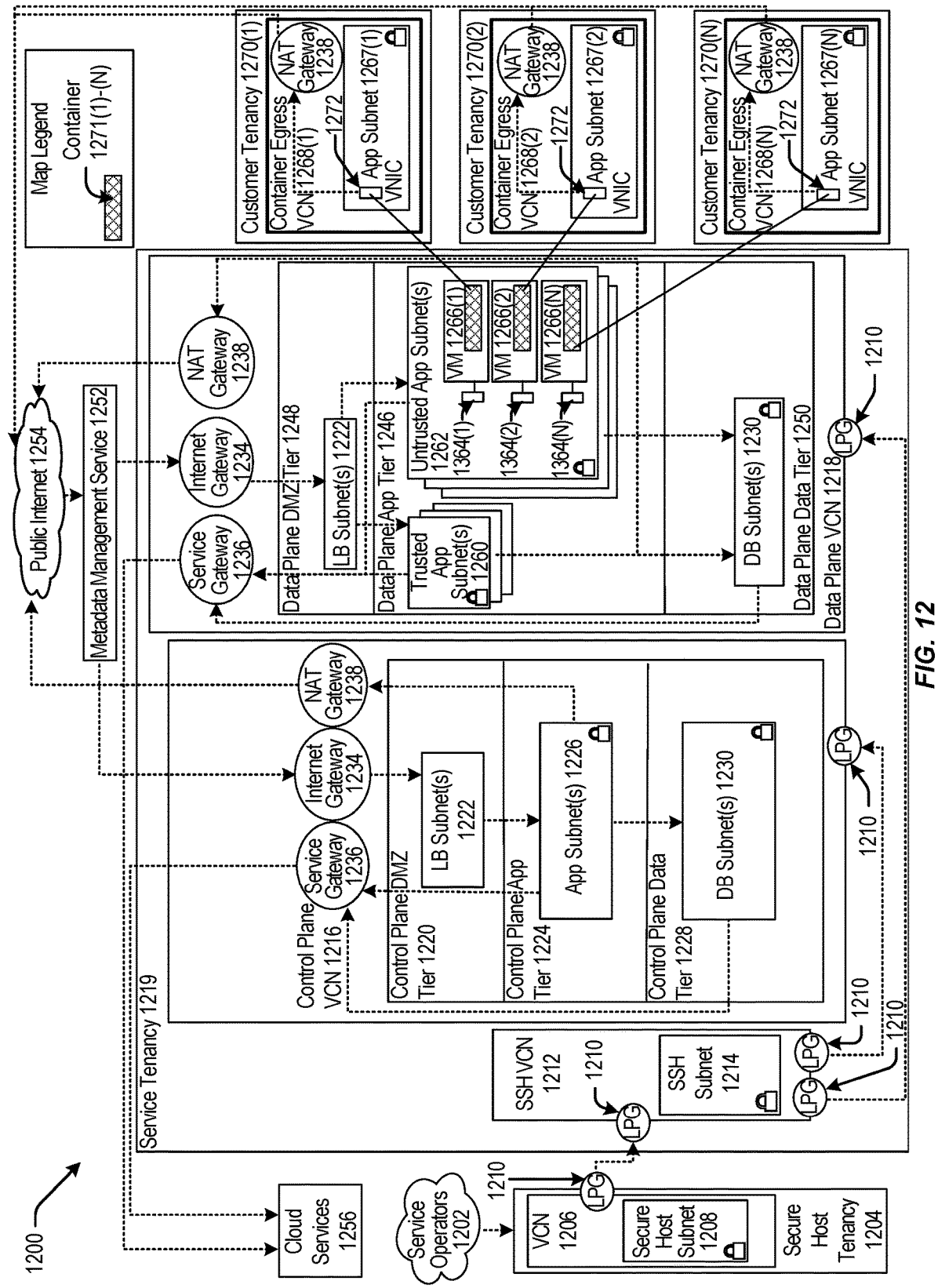
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1002 of FIG. 10) can be communicatively coupled to a secure host tenancy 1204 (e.g. the secure host tenancy 1004 of FIG. 10) that can include a virtual cloud network (VCN) 1206 (e.g. the VCN 1006 of FIG. 10) and a secure host subnet 1208 (e.g. the secure host subnet 1008 of FIG. 10). The VCN 1206 can include an LPG 1210 (e.g. the LPG 1010 of FIG. 10) that can be communicatively coupled to an SSH VCN 1212 (e.g. the SSH VCN 1012 of FIG. 10) via an LPG 1210 contained in the SSH VCN 1212. The SSH VCN 1212 can include an SSH subnet 1214 (e.g. the SSH subnet 1014 of FIG. 10), and the SSH VCN 1212 can be communicatively coupled to a control plane VCN 1216 (e.g. the control plane VCN 1016 of FIG. 10) via an LPG 1210 contained in the control plane VCN 1216 and to a data plane VCN 1218 (e.g. the data plane 1018 of FIG. 10) via an LPG 1210 contained in the data plane VCN 1218. The control plane VCN 1216 and the data plane VCN 1218 can be contained in a service tenancy 1219 (e.g. the service tenancy 1019 of FIG. 10).

The control plane VCN 1216 can include a control plane DMZ tier 1220 (e.g. the control plane DMZ tier 1020 of FIG. 10) that can include load balancer (LB) subnet(s) 1222 (e.g. LB subnet(s) 1022 of FIG. 10), a control plane app tier 1224 (e.g. the control plane app tier 1024 of FIG. 10) that can include app subnet(s) 1226 (e.g. similar to app subnet(s) 1026 of FIG. 10), a control plane data tier 1228 (e.g. the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 10) and a network address translation (NAT) gateway 1238 (e.g. the NAT gateway 1038 of FIG. 10). The control plane VCN 1216 can include the service gateway 1236 and the NAT gateway 1238.

The data plane VCN 1218 can include a data plane app tier 1246 (e.g. the data plane app tier 1046 of FIG. 10), a data plane DMZ tier 1248 (e.g. the data plane DMZ tier 1048 of FIG. 10), and a data plane data tier 1250 (e.g. the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g. public Internet 1054 of FIG. 10).

The Internet gateway 1234 contained in the control plane VCN 1216 and contained in the data plane VCN 1218 can be communicatively coupled to a metadata management service 1252 (e.g. the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
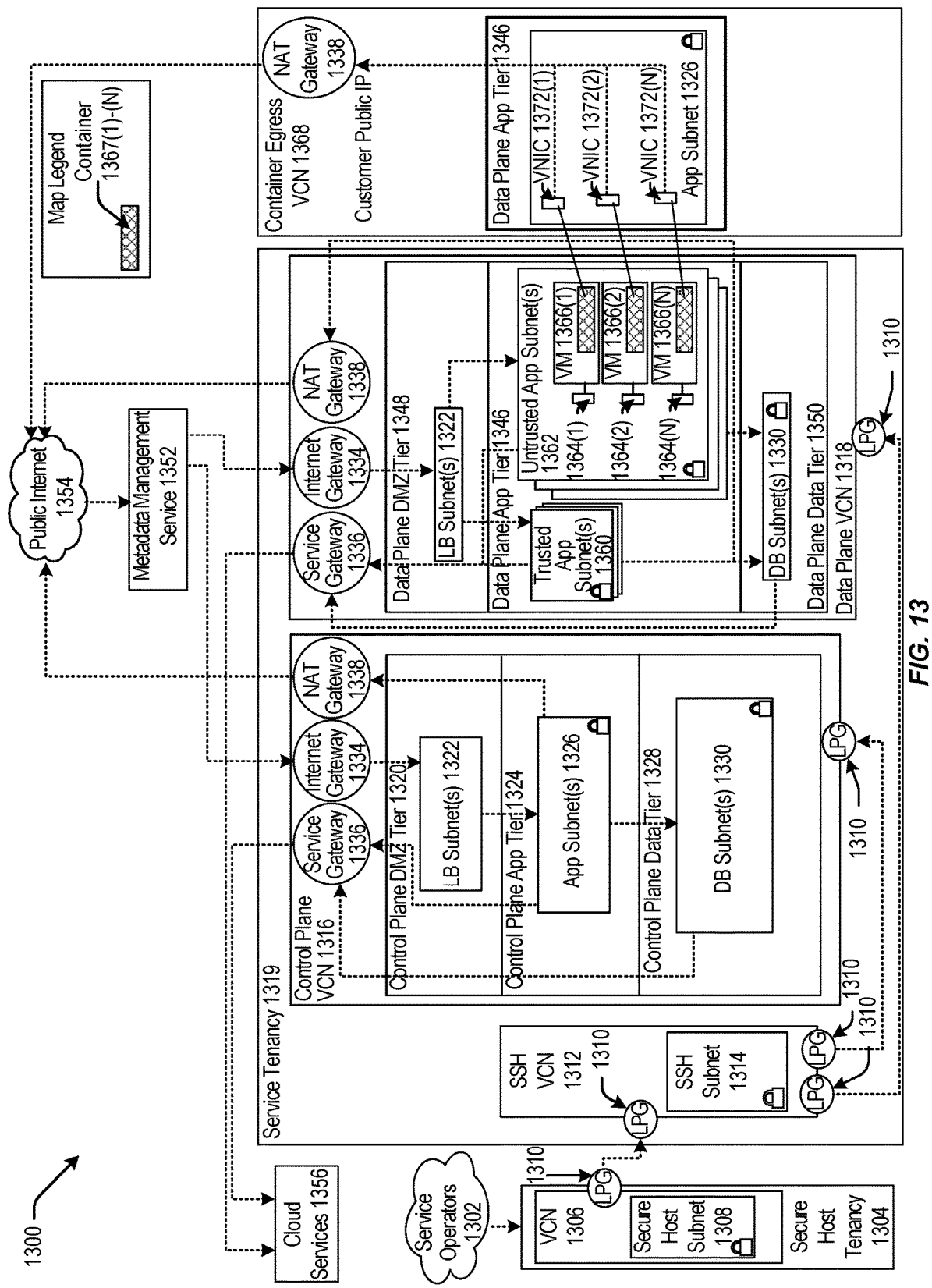
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1002 of FIG. 10) can be communicatively coupled to a secure host tenancy 1304 (e.g. the secure host tenancy 1004 of FIG. 10) that can include a virtual cloud network (VCN) 1306 (e.g. the VCN 1006 of FIG. 10) and a secure host subnet 1308 (e.g. the secure host subnet 1008 of FIG. 10). The VCN 1306 can include an LPG 1310 (e.g. the LPG 1010 of FIG. 10) that can be communicatively coupled to an SSH VCN 1312 (e.g. the SSH VCN 1012 of FIG. 10) via an LPG 1310 contained in the SSH VCN 1312. The SSH VCN 1312 can include an SSH subnet 1314 (e.g. the SSH subnet 1014 of FIG. 10), and the SSH VCN 1312 can be communicatively coupled to a control plane VCN 1316 (e.g. the control plane VCN 1016 of FIG. 10) via an LPG 1310 contained in the control plane VCN 1316 and to a data plane VCN 1318 (e.g. the data plane 1018 of FIG. 10) via an LPG 1310 contained in the data plane VCN 1318. The control plane VCN 1316 and the data plane VCN 1318 can be contained in a service tenancy 1319 (e.g. the service tenancy 1019 of FIG. 10).

The control plane VCN 1316 can include a control plane DMZ tier 1320 (e.g. the control plane DMZ tier 1020 of FIG. 10) that can include LB subnet(s) 1322 (e.g. LB subnet(s) 1022 of FIG. 10), a control plane app tier 1324 (e.g. the control plane app tier 1024 of FIG. 10) that can include app subnet(s) 1326 (e.g. app subnet(s) 1026 of FIG. 10), a control plane data tier 1328 (e.g. the control plane data tier 1028 of FIG. 10) that can include DB subnet(s) 1330 (e.g. DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 10) and a network address translation (NAT) gateway 1338 (e.g. the NAT gateway 1038 of FIG. 10). The control plane VCN 1316 can include the service gateway 1336 and the NAT gateway 1338.

The data plane VCN 1318 can include a data plane app tier 1346 (e.g. the data plane app tier 1046 of FIG. 10), a data plane DMZ tier 1348 (e.g. the data plane DMZ tier 1048 of FIG. 10), and a data plane data tier 1350 (e.g. the data plane data tier 1050 of FIG. 10). The data plane DMZ tier 1348 can include LB subnet(s) 1322 that can be communicatively coupled to trusted app subnet(s) 1360 (e.g. trusted app subnet(s) 1260 of FIG. 12) and untrusted app subnet(s) 1362 (e.g. untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g. public Internet 1054 of FIG. 10).

The Internet gateway 1334 contained in the control plane VCN 1316 and contained in the data plane VCN 1318 can be communicatively coupled to a metadata management service 1352 (e.g. the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
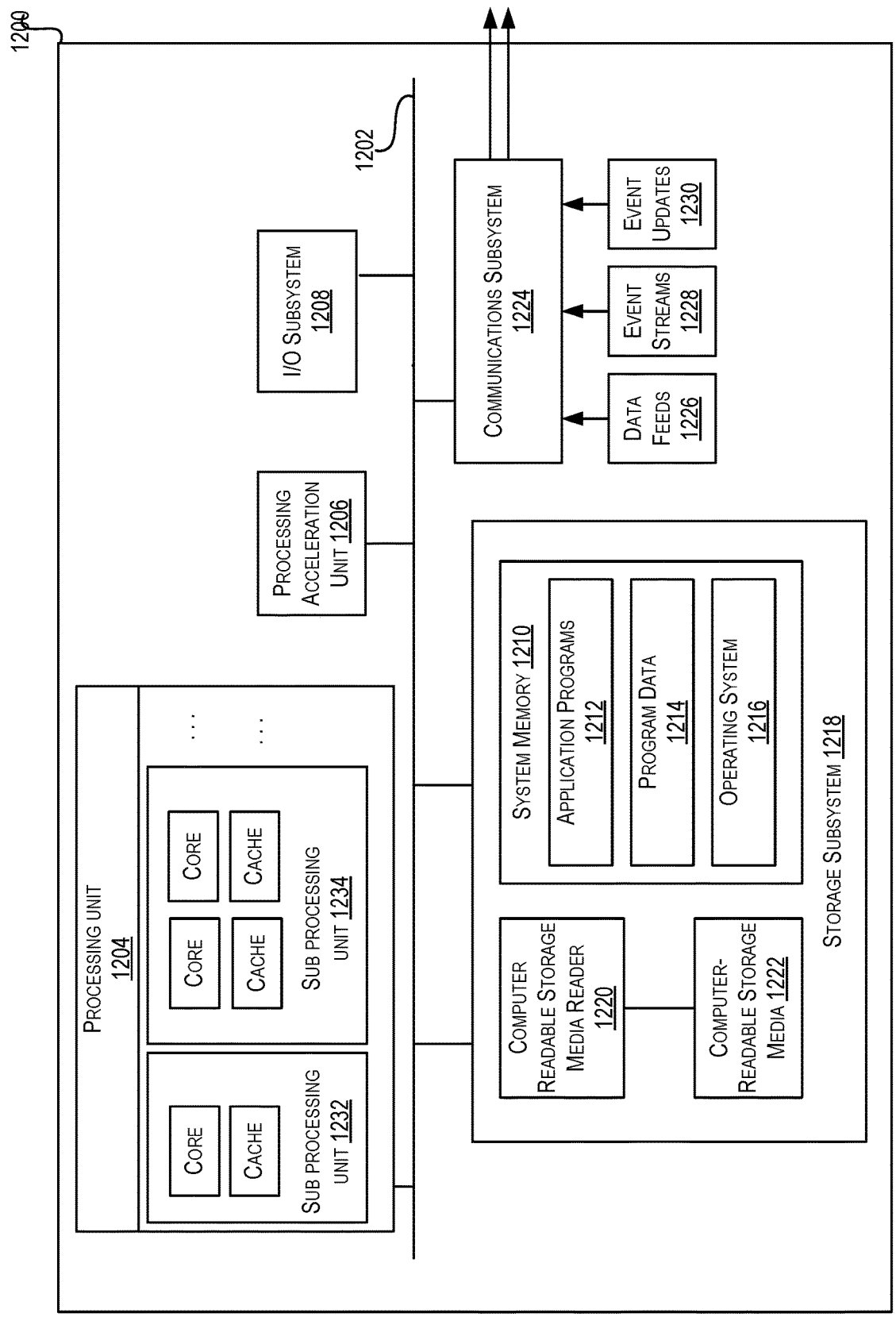
FIG. 14 is a block diagram illustrating an example computer system, according to at least one embodiment.

FIG. 14 illustrates an example computer system 1400, in which various embodiments of the present disclosure may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 14 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present disclosure.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a session manager service, a request to connect a user device to a secure connection to a secure shell instance;
   authorizing, by a session manager service, the user device;
   configuring, by the session manager service, the secure shell instance being described by a shell identifier of the secure shell instance;
   generating, by the session manager service, a nonce token;
   signing, by the session manager service, the nonce token to generate a signed nonce token; and
   providing, by the session manager service, the signed nonce token, the shell identifier, and a router address to the user device.

2. The method of claim 1, wherein authorizing the user device comprises:
   receiving a login token comprising a user identifier from the user device;
   requesting an authorization system public key from an authorization service;
   authenticating the user device based at least in part on decrypting the login token with the authorization system public key;
   requesting a delegation token from the authorization service at least in part by providing the user identifier, a resource identifier of a resource identified in the request, and an expiration period of the request; and
   receiving the delegation token from the authorization service, wherein the authorization service is configured to generate the delegation token upon authorizing access to the resource identified in the request within the expiration period.

3. The method of claim 1, wherein signing the nonce token comprises:
   signing the nonce token using a system private key of a public/private key pair held by the session manager service; and
   providing a system public key of the public/private key pair to a secure shell router at the router address.

4. The method of claim 1, further comprising:
   storing the nonce token in a data store, wherein the nonce token comprises a key sequence; and
   ascertaining whether the nonce token is valid, based at least in part on searching the data store on the key sequence; and
   removing the nonce token from the data store after a secure shell router establishes a secure connection between the user device and the secure shell instance.

5. The method of claim 1, further comprising:
   terminating the secure shell instance following a period of inactivity or a termination of the secure connection by the user device.

6. The method of claim 1, wherein configuring the secure shell instance comprises:
   reserving a block volume;
   receiving a domain identifier corresponding to the block volume;
   allocating an instance on the block volume using the domain identifier, the instance being allocated from a plurality of available instances;
   receiving the shell identifier corresponding to the instance; and
   installing a configuration file on the instance, the configuration file comprising request information included in the request.

7. The method of claim 1, wherein the secure shell instance runs a docker container, such that the request comprises an instruction to execute a terminal on the docker container.

8. A computer system, comprising:
one or more processors;
a memory in communication with the one or more processors, the memory configured to store computer-executable instructions, wherein executing the computer-executable instructions causes the one or more processors to perform steps comprising:
receiving, by a session manager service, a request to connect a user device to a secure connection to a secure shell instance;
authorizing, by a session manager service, the user device;
configuring, by the session manager service, the secure shell instance being described by a shell identifier of the secure shell instance;
generating, by the session manager service, a nonce token;
signing, by the session manager service, the nonce token to generate a signed nonce token; and
providing, by the session manager service, the signed nonce token, the shell identifier, and a router address to the user device.

9. The system of claim 8, wherein authorizing the user device comprises:
receiving a login token comprising a user identifier from the user device;
requesting an authorization system public key from an authorization service;
authenticating the user device based at least in part on decrypting the login token with the authorization system public key;
requesting a delegation token from the authorization service at least in part by providing the user identifier, a resource identifier of a resource identified in the request, and an expiration period of the request;
receiving the delegation token from the authorization service, wherein the authorization service is configured to generate the delegation token upon authorizing access to the resource identified in the request within the expiration period.

10. The system of claim 8, wherein signing the nonce token comprises:
signing the nonce token using a system private key of a public/private key pair held by the session manager service; and
providing a system public key of the public/private key pair to a secure shell router at the router address.

11. The system of claim 8, wherein the computer-executable instructions, when executed, further cause the one or more processors of the computer system to perform the steps comprising:
storing the nonce token in a data store, wherein the nonce token comprises a key sequence; and
ascertaining whether the nonce token is valid, based at least in part on searching the data store on the key sequence; and
removing the nonce token from the data store after a secure shell router establishes a secure connection between the user device and the secure shell instance.

12. The system of claim 8, wherein the computer-executable instructions, when executed, further cause the one or more processors of the computer system to perform the steps comprising:
terminating the secure shell instance following a period of inactivity or a termination of the secure connection by the user device.

13. The system of claim 8, wherein configuring the secure shell instance comprises:
reserving a block volume;
receiving a domain identifier corresponding to the block volume;
allocating an instance on the block volume using the domain identifier, the instance being allocated from a plurality of available instances;
receiving the shell identifier corresponding to the instance; and
installing a configuration file and a delegation token on the instance, the configuration file comprising request information included in the request.

14. The system of claim 8, wherein the secure shell instance runs a docker container, such that the request comprises an instruction to execute a terminal on the docker container.

15. A non-transitory computer-readable storage medium, storing computer-executable instructions that, when executed, cause one or more processors of a computer system to perform steps comprising:
receiving, by a session manager service, a request to connect a user device to a secure connection to a secure shell instance;
authorizing, by a session manager service, the user device;
configuring, by the session manager service, the secure shell instance being described by a shell identifier of the secure shell instance;
generating, by the session manager service, a nonce token;
signing, by the session manager service, the nonce token to generate a signed nonce token; and
providing, by the session manager service, the signed nonce token, the shell identifier, and a router address to the user device.

16. The non-transitory computer-readable storage medium of claim 15, wherein authorizing the user device comprises:
receiving a login token comprising a user identifier from the user device;
requesting an authorization system public key from an authorization service;
authenticating the user device based at least in part on decrypting the login token with the authorization system public key;
requesting a delegation token from the authorization service at least in part by providing the user identifier, a resource identifier of a resource identified in the request, and an expiration period of the request; and
receiving the delegation token from the authorization service, wherein the authorization service is configured to generate the delegation token upon authorizing access to the resource identified in the request within the expiration period.

17. The non-transitory computer-readable storage medium of claim 15, wherein signing the nonce token comprises:
signing the nonce token using a system private key of a public/private key pair held by the session manager service; and
providing a system public key of the public/private key pair to a secure shell router at the router address.

18. The non-transitory computer-readable storage medium of claim 15, wherein the computer-executable instructions, when executed, further cause the one or more processors of the computer system to perform the steps comprising:

storing the nonce token in a data store, wherein the nonce token comprises a key sequence; and ascertaining whether the nonce token is valid, based at least in part on searching the data store on the key sequence; and removing the nonce token from the data store after a secure shell router establishes a secure connection between the user device and the secure shell instance.

19. The non-transitory computer-readable storage medium of claim 15, wherein the computer-executable instructions, when executed, further cause the one or more processors of the computer system to perform the steps comprising:

terminating the secure shell instance following a period of inactivity or a termination of the secure connection by the user device.

20. The non-transitory computer-readable storage medium of claim 15, wherein configuring the secure shell instance comprises:

reserving a block volume;

receiving a domain identifier corresponding to the block volume;

allocating an instance on the block volume using the domain identifier, the instance being allocated from a plurality of available instances;

receiving the shell identifier corresponding to the instance; and installing a configuration file on the instance, the configuration file comprising request information included in the request.

* * * * *